(12) United States Patent
Song

(10) Patent No.: US 12,370,018 B2
(45) Date of Patent: Jul. 29, 2025

(54) ORTHODONTIC ALIGNER WITH BULGES

(71) Applicant: 1092228 B.C. Ltd, Anmore (CA)

(72) Inventor: Zhi Chun Song, Anmore (CA)

(73) Assignee: 1092228 B.C. Ltd., Anmore (CA)

( * ) Notice: Subject to any disclaimer, the term of this patent is extended or adjusted under 35 U.S.C. 154(b) by 62 days.

(21) Appl. No.: 18/064,940

(22) Filed: Dec. 13, 2022

(65) Prior Publication Data

US 2023/0135019 A1 May 4, 2023

Related U.S. Application Data

(63) Continuation of application No. 17/812,446, filed on Jul. 14, 2022, and a continuation of application No. 17/808,545, filed on Jun. 24, 2022.

(30) Foreign Application Priority Data

Jan. 31, 2022 (WO) ................ PCT/CA2022/050135
Oct. 28, 2022 (WO) ................ PCT/IB2022/060418

(51) Int. Cl.
*A61C 7/08* (2006.01)
*A61C 7/36* (2006.01)

(52) U.S. Cl.
CPC . *A61C 7/08* (2013.01); *A61C 7/36* (2013.01)

(58) Field of Classification Search
CPC ............. A61C 7/08; A61C 7/36; A61F 5/566
See application file for complete search history.

(56) References Cited

U.S. PATENT DOCUMENTS

| | | | | |
|---|---|---|---|---|
| 3,518,988 A * | 7/1970 | Gores | ................ | A63B 71/085 |
| | | | | 128/861 |
| 6,505,625 B1 * | 1/2003 | Uenishi | ................ | A61C 7/08 |
| | | | | 128/859 |
| 6,572,372 B1 * | 6/2003 | Phan | ................ | A61C 7/08 |
| | | | | 433/18 |
| 11,369,510 B2 * | 6/2022 | Huang | ................ | A61F 5/566 |
| 2006/0099546 A1 * | 5/2006 | Bergersen | ................ | A61C 7/36 |
| | | | | 433/6 |
| 2015/0238280 A1 * | 8/2015 | Wu | ................ | A61C 7/08 |
| | | | | 433/24 |
| 2016/0310237 A1 * | 10/2016 | Hung | ................ | A61C 7/002 |
| 2018/0153733 A1 * | 6/2018 | Kuo | ................ | A61F 5/58 |
| 2019/0000592 A1 * | 1/2019 | Cam | ................ | A61C 7/002 |
| 2020/0138546 A1 * | 5/2020 | Mohrlock | ................ | A61C 7/08 |
| 2023/0131801 A1 * | 4/2023 | Li | ................ | A61C 7/002 |
| | | | | 433/6 |
| 2023/0225833 A1 * | 7/2023 | Boronkay | ................ | G05B 15/02 |
| | | | | 703/7 |
| 2023/0240803 A1 * | 8/2023 | Song | ................ | A61C 7/08 |
| | | | | 433/6 |

* cited by examiner

*Primary Examiner* — Thomas C Barrett
*Assistant Examiner* — Matthew P Saunders
(74) *Attorney, Agent, or Firm* — Nexus Law Group LLP; Nicholas Toth; Otto Zsigmond

(57) ABSTRACT

An orthodontic appliance, being an aligner or retainer, includes upper and lower appliance members, upper and lower biting walls, and at least two bulges. The appliance defines a receiving space for receiving a crown of the teeth. When the appliance is fully installed, the mandible is in centric relation, and the upper and lower biting walls contact each other adjacent to right and left molars of the teeth, then right and left bulges are situated over right and left premolars of the teeth, and a distal end of each bulge is dimensioned to contact the opposing biting wall.

5 Claims, 15 Drawing Sheets

ORTHODONTIC ALIGNER WITH BULGES

CROSS-REFERENCE TO RELATED APPLICATIONS

The present application claims priority to PCT patent application PCT/CA2022/050135 filed on Jan. 31, 2022, is a continuation of U.S. application Ser. No. 17/808,545 filed on Jun. 24, 2022, is a continuation of U.S. application Ser. No. 17/812,446 filed on Jul. 14, 2022, and the present application claims priority to PCT patent application PCT/IB2022/060418 filed on Oct. 28, 2022.

FIELD OF INVENTION

This invention relates to orthodontic appliances and, in particular, to an orthodontic aligner or retainer which employs bulges at the aligners to maintain a wedge-shaped space between the occluding surfaces of the upper dental arch and the lower dental arch when the aligners are fully installed to achieve a good orthodontic result.

DESCRIPTION OF RELATED ART

Interocclusal rest space refers to a space between the occluding surfaces of the upper dental arch and the lower dental arch when the mandible is in the rest position. The Interocclusal rest space usually is 2-4 mm. The Interocclusal rest space is a wedge-shaped space, and it is greater at the anterior teeth than the posterior teeth. When a person having normal occlusion open his mouth, a space between the occluding surfaces of the upper dental arch and the lower dental arch is always wedge-shaped. When an upper and a lower aligner are fully installed in a patient's mouth for a first time, a space between the occluding surfaces of the upper dental arch and the lower dental arch is formed; this space should be wedge-shaped and should be greater at the anterior teeth than the posterior teeth. If this patient accepts aligner treatment, an aligner usually has a consistent thickness at each portion of the biting wall of the aligner, such that the upper aligner and the lower aligner of this patient would have premature contact over the last molars in an early stage of the orthodontic treatment; and this premature contact may cause molar intrusion. This contact relationship between the upper and lower aligners is not stable, more contact points between the aligners over the premolars and anterior teeth may be permitted while the molar intrusion gradually become severe. When the aligners are permitted to have contacts over the premolars and anterior teeth, the space between the occluding surfaces of the upper and lower dental arches become more stable. After a few weeks of aligner wearing, an open bite problem at the molar region becomes apparent gradually in the patient, and the space between the occluding surfaces of the upper dental arch and the lower dental arch is not a wedge-shaped space; these two occluding surfaces become relatively parallel, and the space has similar width at the anterior teeth and the posterior teeth. The back teeth open bite generated by wearing the aligner gives great trouble to orthodontic treatment and has big influence on patient daily life, such as eating. Some improvement needs to be done to solve this problem.

SUMMARY OF THE INVENTION

To maintain a wedge-shaped space between the occluding surfaces of the upper dental arch and the lower dental arch when the aligners are fully installed is a precondition to realize a good occlusion of a patient who wears aligners. The present invention provides an orthodontic appliance for repositioning teeth, the teeth form an upper dental arch and a lower dental arch of a patient. The orthodontic appliance comprises an upper aligner conforming to the upper dental arch at the patient's maxilla and a lower aligner conforming to the lower dental arch at the patient's mandible; a biting wall of the aligners conforms to an occlusal surface of posterior teeth of the teeth and an incisal edge of anterior teeth of the teeth. Part of the biting wall of one of the aligners is spaced away from a tooth surface of the teeth when the aligners are fully installed, such that at least one bulge is applied at the biting wall; the at least one bulge is dimensioned and positioned to maintain a wedge-shaped space between occlusal surfaces of the upper posterior teeth of the teeth and the lower posterior teeth of the teeth when the aligners are fully installed and contact each other, and the wedge-shaped space is greater at premolars of the teeth than molars of the teeth.

Implementations may include one or more of the following features. A bulge space formed between the bulge and the tooth surface of the teeth may be occupied with a filling material when the aligners are fully installed. A bulge space formed between the bulge and the tooth surface of the teeth may be occupied with another layer of aligner material when the aligners are fully installed. At least one said bulge may be applied over right premolars of the teeth and at least one said bulge may be applied over left premolars of the teeth when the aligners are fully installed. At least one said bulge may be applied over anterior teeth of the teeth when the aligners are fully installed. The bulges may have a shape similar to a natural tooth cusp. Each one of the bulges may cover part of an occlusal surface of one tooth of the teeth. The bulges may cover part of an occlusal surface of both of two adjacent teeth. The bulges may cover part of a side surface of the teeth. The wedged-shape space may be equal to or wider than the Interocclusal rest space. The at least one bulge may comprise two said bulges applied at one of right side and left side of the aligners, and wherein the anterior one of said two bulges is higher than the posterior one of said two bulges.

The present invention also provides an orthodontic appliance for repositioning teeth, the teeth forming an upper dental arch and a lower dental arch of a patient. The orthodontic appliance comprises an upper aligner conforming to the upper dental arch and a lower aligner conforming to the lower dental arch. Part of the aligners is spaced away from an incisal edge of anterior teeth of the teeth when the aligners are fully installed, such that one or more bulge of the aligners is applied over the incisal edge of the anterior teeth.

Implementations may include one or more of the following features. A bulge space formed between said bulge and the incisal edge may be occupied with a filing material. The filling material may be attached with the aligner. The orthodontic appliance may comprise at least one bite ramp applied at a lingual surface of upper anterior teeth of the teeth, and at least one said bulge is formed over an incisal edge of lower anterior teeth of the teeth; and wherein the at least one bulge and the at least one bite ramp may be dimensioned to have contact with each other when the fully installed aligners make contact. The at least one bite ramp may comprise a guiding surface facing down and forward, and wherein the at least one bulge and the at least one bite ramp are dimensioned to guide the mandible forward by urging a distal end of the at least one bulge to slide forward and upward on the guiding surface when the fully installed aligners make contact. The bulge may be dimensioned and positioned to maintain a wedge-shaped space between occlusal surfaces of upper posterior teeth of the teeth and lower posterior teeth of the teeth when the fully installed aligners make contact, and wherein the wedge-shaped space is greater at premolars of the teeth than molars of the teeth. The wedge-shaped space may be equal to or greater than an interocclusal rest space.

The present invention also provides an orthodontic appliance for repositioning teeth, the teeth form an upper dental arch and a lower dental arch of a patient, the orthodontic appliance comprise an upper aligner conforming to the upper dental arch and a lower aligner conforming to the lower dental arch; a biting wall of the aligners conforms to an occlusal surface of posterior teeth of the teeth and an incisal edge of anterior teeth of the teeth; part of the biting wall is thicker than other parts of the biting wall, such that at least one bulge is formed in the biting wall; the at least one bulge is dimensioned and positioned to maintain a wedge-shaped space between occlusal surfaces of the upper posterior teeth of the teeth and the lower posterior teeth of the teeth when the aligners are fully installed and have contact with each other, and the wedge-shaped space is greater at premolars of the teeth than molars of the teeth.

Implementations may include one or more of the following features. At least one said bulge may be applied over the anterior teeth when the aligners are fully installed. At least one said bulge may be applied over right first premolars of the teeth and at least one said bulge may be applied over left first premolars of the teeth when the aligners are fully installed. At least one said bulge may be applied over right premolars of the teeth and at least one said bulge may be applied over left premolars of the teeth when the aligners are fully installed.

The present invention also provides an orthodontic appliance for holding teeth in place, the teeth form an upper dental arch and a lower dental arch of a patient, the orthodontic appliance comprise an upper retainer conforming to the upper dental arch and a lower retainer conforming to the lower dental arch; a biting wall of the retainers conforms to an occlusal surface of posterior teeth of the teeth and an incisal edge of anterior teeth of the teeth; part of the biting wall is thicker than other parts of the biting wall, such that at least one bulge is formed in the biting wall; the at least one bulge is dimensioned and positioned to maintain a wedge-shaped space between occlusal surfaces of the upper posterior teeth of the teeth and the lower posterior teeth of the teeth when the retainers are fully installed and have contact with each other, and the wedge-shaped space is greater at premolars of the teeth than molars of the teeth.

Implementations may include one or more of the following features. At least one said bulge may be applied over the anterior teeth when the retainers are fully installed. At least one said bulge may be applied over right first premolars of the teeth and at least one said bulge may be applied over left first premolars of the teeth when the retainers are fully installed. At least one said bulge may be applied over right premolars of the teeth and at least one said bulge may be applied over left premolars of the teeth when the retainers are fully installed.

The present invention also provides an orthodontic appliance for repositioning teeth, the teeth form an upper dental arch and a lower dental arch of a patient, the orthodontic appliance comprises an upper aligner conforming to the upper dental arch and a lower aligner conforming to the lower dental arch; the aligners define a receiving space for accommodating a crown of the teeth and the receiving space is occupied by the crown of the teeth when the aligners are fully installed; a biting wall of the aligners conforms to an occlusal surface of posterior teeth of the teeth and an incisal edge of anterior teeth of the teeth; part of the biting wall is spaced outwardly away from the receiving space, such that at least one bulge is formed at the biting wall; and the at least one bulge is dimensioned and positioned to maintain a wedge-shaped space between occlusal surfaces of the upper posterior teeth of the teeth and the lower posterior teeth of the teeth when the aligners are fully installed and contact each other, and the wedge-shaped space is greater at premolars of the teeth than molars of the teeth.

Implementations may include one or more of the following features. A bulge space formed between the bulge and the tooth surface of the teeth may be occupied with a filling material when the aligners are fully installed. A bulge space formed between the bulge and the tooth surface of the teeth may be occupied with another layer of aligner material when the aligners are fully installed. At least one said bulge may be applied over right first premolars of the teeth and at least one said bulge may be applied over left first premolars of the teeth. At least one said bulge may be applied over right premolars of the teeth and at least one said bulge may be applied over left premolars of the teeth. At least one said bulge may be applied over anterior teeth of the teeth. The bulges may have a shape similar to a natural tooth cusp. Each one of the bulges may cover part of an occlusal surface of one tooth of the teeth. The bulges may cover only a cusp of one tooth of the teeth. The bulges may cover part of an occlusal surface of both of two adjacent teeth. The bulges may cover part of a side surface of the teeth. The wedged-shape space may be equal to or wider than the Interocclusal rest space. The at least one bulge may comprise two said bulges applied at one of right side and left side of the aligners, and wherein the anterior one of said two bulges is higher than the posterior one of said two bulges.

The present invention also provides an orthodontic appliance for repositioning teeth, the teeth form an upper dental arch and a lower dental arch of a patient, the orthodontic appliance comprises an upper aligner conforming to the upper dental arch and a lower aligner conforming to the lower dental arch; the aligners define a receiving space for accommodating a crown of the teeth and the receiving space is occupied by the crown of the teeth when the aligners are fully installed; at least part of the aligners conforming to an incisal edge of anterior teeth of the teeth is spaced outwardly away from the receiving space, such that at least one bulge is formed at the aligners.

The present invention also provides an orthodontic appliance for holding teeth in place, the teeth form an upper dental arch and a lower dental arch of a patient, the orthodontic appliance comprises an upper retainer conforming to the upper dental arch and a lower retainer conforming to the lower dental arch; the retainers define a receiving space for accommodating a crown of the teeth and the receiving space is occupied by the crown of the teeth when the retainers are fully installed; a biting wall of the retainers conforms to an occlusal surface of posterior teeth of the teeth and an incisal edge of anterior teeth of the teeth; part of the biting wall is spaced outwardly away from the receiving space, such that at least one bulge is formed at the biting wall; and the at least one bulge is dimensioned and positioned to maintain a wedge-shaped space between occlusal surfaces of the upper posterior teeth of the teeth and the lower posterior teeth of the teeth when the retainers are fully installed and contact each other, and the wedge-shaped space is greater at premolars of the teeth than molars of the teeth.

Implementations may include one or more of the following features. A bulge space formed between the bulge and the tooth surface of the teeth may be occupied with a filling material when the retainers are fully installed. A bulge space formed between the bulge and the tooth surface of the teeth may be occupied with another layer of retainer material when the retainers are fully installed. At least one said bulge may be applied over right first premolars of the teeth and at least one said bulge may be applied over left first premolars of the teeth when the retainers are fully installed. At least one said bulge may be applied over right premolars of the teeth and at least one said bulge may be applied over left premolars of the teeth when the retainers are fully installed. At least one said bulge may be applied over anterior teeth of the teeth. The bulges may have a shape similar to a natural tooth cusp. Each one of the bulges may cover part of an occlusal surface of one tooth of the teeth. The bulges may cover only a cusp of one tooth of the teeth. The bulges may cover part of an occlusal surface of both of two adjacent teeth. The bulges may cover part of a buccal surface of the teeth.

The present invention also provides an orthodontic appliance for repositioning teeth, the teeth form an upper dental arch and a lower dental arch of a patient, the orthodontic appliance comprise an upper aligner conforming to the upper dental arch and a lower aligner conforming to the lower dental arch; and the aligners define a receiving space for accommodating a crown of the teeth and the receiving space is occupied by the crown of the teeth when the aligners are fully installed. Part of the aligners is spaced outwardly away from the receiving space, such that at least one bulge is formed at the aligners, and the at least one bulge is dimensioned and positioned to maintain a wedge-shaped space between occlusal surfaces of the upper posterior teeth of the teeth and the lower posterior teeth of the teeth when the aligners are fully installed and contact each other, and the wedge-shaped space is greater at premolars of the teeth than molars of the teeth.

Implementations may include one or more of the following features. The at least one bulge may be applied over a buccal surface of the teeth when the aligners are fully installed. The at least one bulge may be applied over a lingual surface of the teeth when the aligners are fully installed. The at least one bulge may be applied over an occlusal surface of posterior teeth of the teeth when the aligners are fully installed. The at least one bulge may be applied over an incisal edge of anterior teeth of the teeth when the aligners are fully installed. The at least one bulge may be applied over a buccal surface of anterior teeth of the teeth when the aligners are fully installed. The at least one bulge may be applied over a buccal surface of canines of the teeth when the aligners are fully installed.

The foregoing summary is illustrative only and is not intended to be in any way limiting. Other aspects and features of the present invention will become apparent to those of ordinary skill in the art upon review of the following description of embodiments of the invention in conjunction with the accompanying figures and claims.

BRIEF DESCRIPTION OF THE DRAWINGS

Various objects, features and advantages of the invention will be apparent from the following description of embodiments of the invention, as illustrated in the accompanying drawings. The drawings are not necessarily to scale, emphasis instead being placed upon illustrating the principles of various embodiments of the invention.

Figure 1:
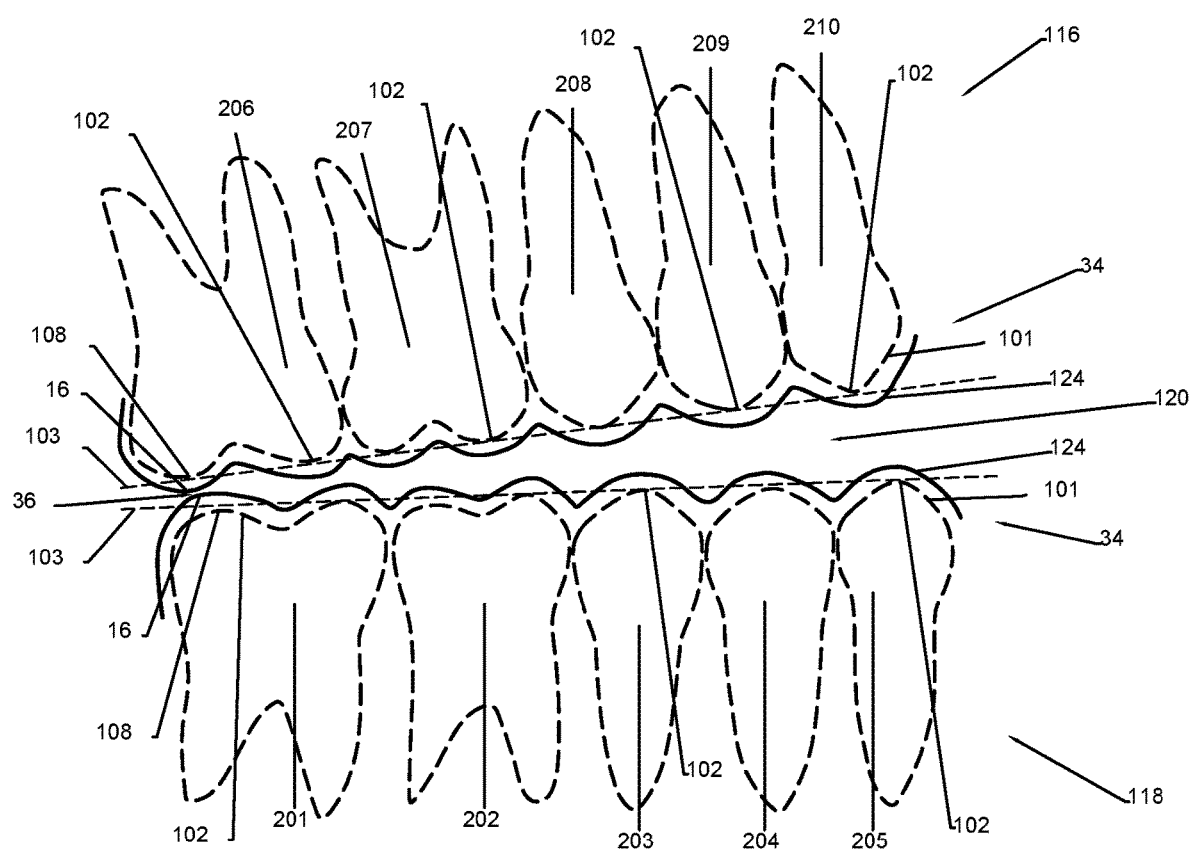
FIG. 1 is a vertical sectional view of part of a dentition, showing a wedge-shaped space between the occluding surfaces of the upper and lower dental arches.

The dotted lines represent teeth and the solid line represent aligner. Part of the dotted lines next to the solid line represents a crown of the teeth, this part of the dotted lines also represents a receiving space of the aligner.

DETAILED DESCRIPTION OF PREFERRED EMBODIMENTS

To maintain a wedge-shaped space between occluding surfaces of the upper dental arch and the lower dental arch when aligners are fully installed is a precondition for a patient to have a good occlusion. The present invention provides an orthodontic appliance for repositioning teeth, the teeth form an upper dental arch and a lower dental arch of a patient, the orthodontic appliance comprises an upper aligner conforming to the upper dental arch located at this patient's maxilla and a lower aligner conforming to the lower dental arch located at this patient's mandible; an aligner biting wall of the aligners conforms to an occlusal surface of posterior teeth of the teeth and an incisal edge of anterior teeth of the teeth; and part of the aligner biting wall is spaced away from a surface of the teeth when the aligners are fully installed, such that at least one bulge is applied at the biting wall of the aligners, and a bulge space is formed between the bulge and the tooth surface; the bulge is dimensioned and positioned to maintain a wedge-shaped space between occlusal surfaces of the upper posterior teeth and the lower posterior teeth when the aligners are fully installed and contact each other, and this wedge-shaped space is greater at premolars than molars. The shape of the space between upper and lower occlusal surfaces is determined by the thickness of the aligners and by the shape and the position of the bulges, the thickness of the aligners usually is 0.5-0.7 mm; by employing the bulges with different height at different sites or by employing the bulge only at certain location, this wedge-shaped space can be maintained by the bulges. A dental arch includes posterior teeth and anterior teeth.

We can use another way to define the bulge of the aligner. The aligners define a receiving space which is designed for accommodate a crown of the teeth and is occupied by the crown of the teeth when the aligners are fully installed; a biting wall of the aligners conforms to an occlusal surface of posterior teeth of the teeth and an incisal edge of anterior teeth of the teeth; part of the biting wall is spaced outwardly away from the receiving space, such that at least one bulge is formed at the biting wall. We can define a bulge of a retainer in the same way.

When a patient with normal occlusion makes a small opening movement of his mandible, the mandible makes circular motions with the head of condyloid process of the mandible as the center. When the patient opens his mouth a little, a width of the wedge-shaped space between the upper and lower occluding surfaces at a site (for example right lower first molar) is proportional to a distance from this site (right lower first molar) to the head of condyloid process. For a patient with upper and lower aligners fully installed, if the aligners have contact at second molars and the thickness of the aligners is 0.7 mm, the width of the wedge-shaped space at the second molars is at least 1.4 mm; the distance from the lower incisors to the head of condyloid process is approximate double the distance from the lower second molar to the head of condyloid process, such that the width of the wedge-shaped space should be at least 2.8 mm at the lower incisors. To maintain the width of the wedge-shaped space at the lower incisors, at least one bulge which has a height of 2.1 mm needs to be applied to occupy the wedge-shaped space and to maintain the stability of the wedge-shaped space. Usually, a height of an aligner bulge may vary from 1.2 mm to 3 mm according to the treatment requirement. A width of the wedge-shaped space at one of the lower teeth refers to the distance from the middle point of an occluding surface of that tooth to the occluding surface of the upper dentition. A distance from that tooth to the head of the condyloid process refers to the distance from the middle point of the occluding surface of that tooth to the head of condyloid process. If an aligner case having good occlusion while taking off the aligners, the configuration of the wedge-shaped space with the aligners being fully installed and contacting each other is determined by the thickness of the aligners, the formation of the dental arches, the shape of the mandible and TMJ; the bulge is dimensioned and positioned to maintain the specific configuration of the wedge-shaped space between occluding surfaces of the upper dental arch and the lower dental arch when the aligners are fully installed and contact each other.

In a 3-dimensional virtual representation of a treatment plan, a wedge-shaped space with specific configuration should be arranged between the occluding surfaces of upper dental arch and lower dental arch, such that the aligner bulges at the biting wall of the aligners can be arranged easily to maintain the wedge-shaped space when the aligners are fully installed and contact each other. This virtual representation of the treatment plan may be 2D or 3D. A width of the posterior part of the wedge-shaped space between the occlusal surfaces of the upper second molar and the lower second molar should be about twice of the thickness of the aligner, and a width of the anterior part of the wedge-shaped space between the occluding surfaces of the upper incisor and the lower incisor should be about twice of the width of the posterior part. The dimension and position of the bulge may vary according to different treatment requirement.

FIG. 1 is a vertical cross section view of part of a dentition, showing part of the right side of the dentition. This figure shows that a wedge-shaped space 120 exists between occlusal surfaces 108 of the upper posterior teeth and the lower posterior teeth when an upper aligner 16 and a lower aligner 16 are in fully installed position 34. The biting wall 124 of the lower aligner 16 only has contact 36 with the biting wall 124 of the upper aligner 16 over the second molars. At least one repositionable tooth which is arranged to be repositioned is among the teeth of the dental arches. An aligner 16 usually has a consistent thickness at each portion of the biting wall 124 of the aligner 16, such that a part of the biting wall 124 of the upper aligner 16 over the last upper molar 206 and a part of the biting wall 124 of the lower aligner 16 over the last lower molar 201 usually have premature contact 36 in an early stage of the orthodontic treatment, and this figure shows the premature contact 36. After a few weeks of aligner wearing, this premature contact 36 may cause the upper and lower last molars to intrude and an open bite problem at molars region to appear gradually in the patient; the space 120 between the occluding surfaces of the upper and lower dental arches would not be a wedge-shaped space, and the two occluding surfaces of the upper dental arch and the lower dental arch become relatively parallel, with the space 120 having similar width at the anterior teeth and the posterior teeth. The occlusal plane 103 refers to an imaginary surface that theoretically touches the incisal edges of the anterior teeth and the tips of the occlusal surfaces of the posterior teeth. A receiving space 101 defined by the aligners is occupied by the crowns of the teeth when the aligners are in fully installed position 34.

In the embodiments of this application tooth 210 is upper canine, tooth 209 is upper first premolar, tooth 208 is upper second premolar, tooth 207 is upper first molar, and tooth 206 is upper second molar; tooth 205 is lower canine, tooth 204 is lower first premolar, tooth 203 is lower second premolar, tooth 202 is lower first molar, and tooth 201 is lower second molar. Canines and incisors are anterior teeth, premolars and molars are posterior teeth. FIGS. 1 to 11 show part of the right side of the dentition, and in these cases the left side of the dentition may have the same arrangements and design at the aligners.

Figure 2:
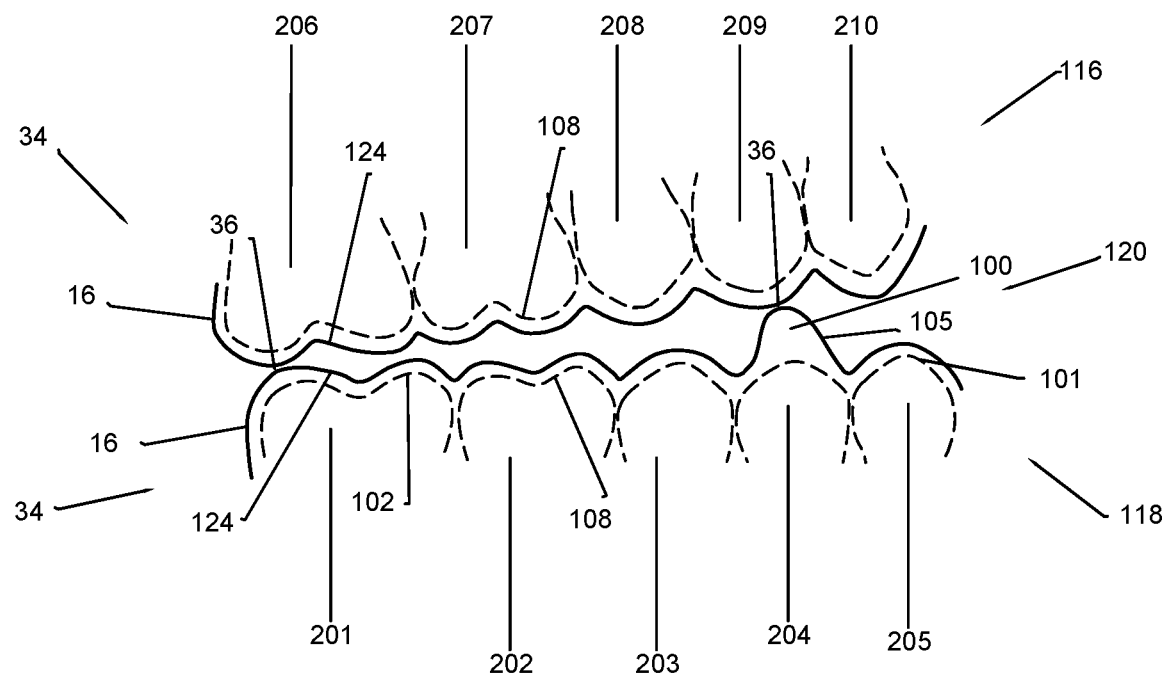
FIG. 2 is a vertical sectional view of part of a dentition according to a first embodiment, showing a bulge applied over a lower first premolar.

FIG. 2 is a vertical cross section view of part of a dentition, showing part of the right side of the dentition. This figure shows that a wedge-shaped space 120 exists between occlusal surfaces 108 of upper posterior teeth and lower posterior teeth when an upper aligner 16 and a lower aligner 16 are in fully installed position 34. Part of a biting wall 124 of the lower aligner 16 spaces up from the occlusal surface 108 of lower first premolar 204, such that a bulge 105 is formed at the biting wall 124 of the lower aligner 16 and located over the lower first premolar 204. A receiving space 101 defined by the aligners 16 is completely occupied by the crowns of the teeth. Part of a biting wall 124 of the lower aligner 16 spaces away from the receiving space 101, such that a bulge 105 is formed at the biting wall 124 located over tooth 204. A bulge space 100 is formed between the bulge 105 and the occlusal surface 108 of the tooth 204; the bulge space 100 communicates with the receiving space 101 and is beyond the receiving space 101. A bulge 105 may be applied over an occlusal surface of upper premolars to get a similar result. The bulge has a shape similar to a natural tooth cusp in this embodiment, but the bulge may have other shapes. In this case, at least one bulge 105 of the aligners is applied over right premolars and at least one bulge 105 of the aligners is applied over left premolars; bulges applied over incisors are not shown in this figure. In this case at least one bulge may be applied over an incisal edge of the incisors. The bulge 105 has a contact point 36 with the upper aligner 16. The aligners 16 also have contact 36 over the last molars. The aligners 16 and the bulges 105 are dimensioned to maintain a wedged-shaped space 120 between the occlusal surfaces 108 of the upper posterior teeth and the lower posterior teeth, and this space 120 is occupied by the aligners 16, which has contact with each other. The space 120 is greater at premolars than molars. The bulge 105 may be applied over a functional cusp of the teeth or over a non-functional cusp of the teeth. The bulge 105 may also be applied over a fossa of an occlusal surface of one or more tooth. A bulge may only cover part of an occlusal surface of a tooth; a bulge may cover a whole occlusal surface of a tooth. The bulge may cover a tooth cusp of one or more tooth. The bulge may cover part of a tooth cusp of a tooth. The bulge may have any shape. The bulge may cover the occlusal surfaces of more than one tooth. The bulge may cover an incisal edge of one or more tooth.

Figure 3:
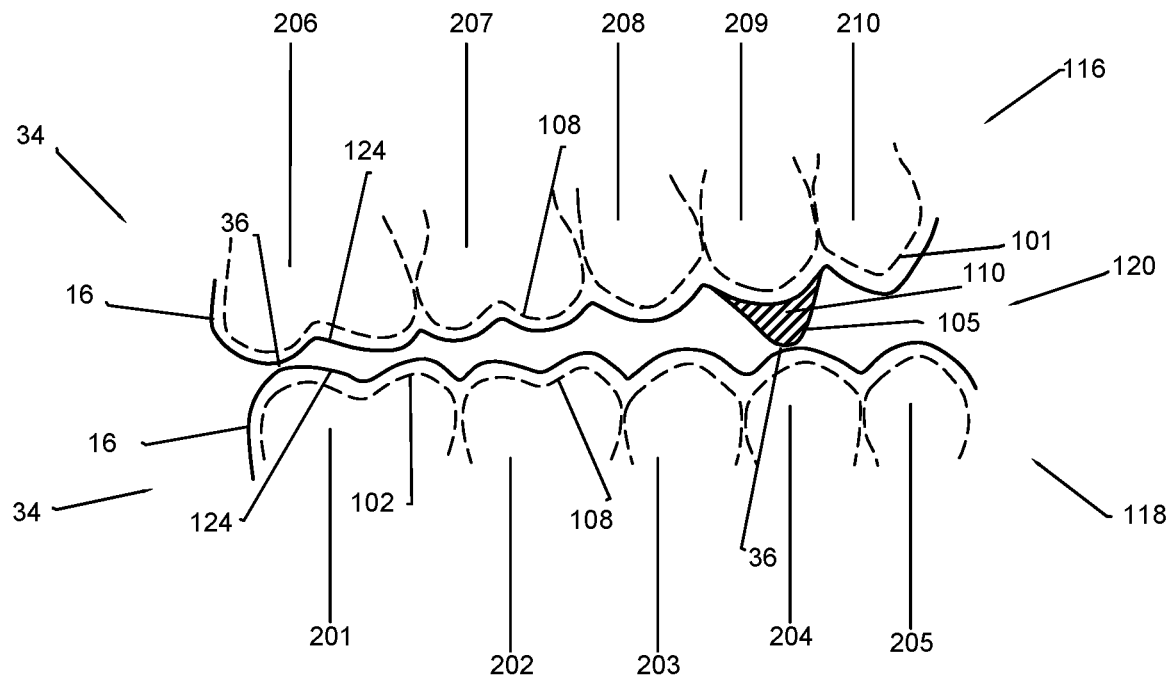
FIG. 3 is a vertical sectional view of part of a dentition, showing a variation of the first embodiment and a bulge applied over an upper first premolar.

FIG. 3 is a vertical cross section view of part of a dentition, showing part of the right side of the dentition. Upper and lower aligners are fully installed. A bulge 105 is applied over an occlusal surface 108 of upper first premolar 209. Here a space between the bulge 105 and the occlusal surface 108 is filled with a filling material 110. The filling material 110 is attached with the aligner 16. The upper bulge 105 has a contact point 36 with the lower aligner 16. The aligners 16 also have contact over the last molars.

Figure 4:
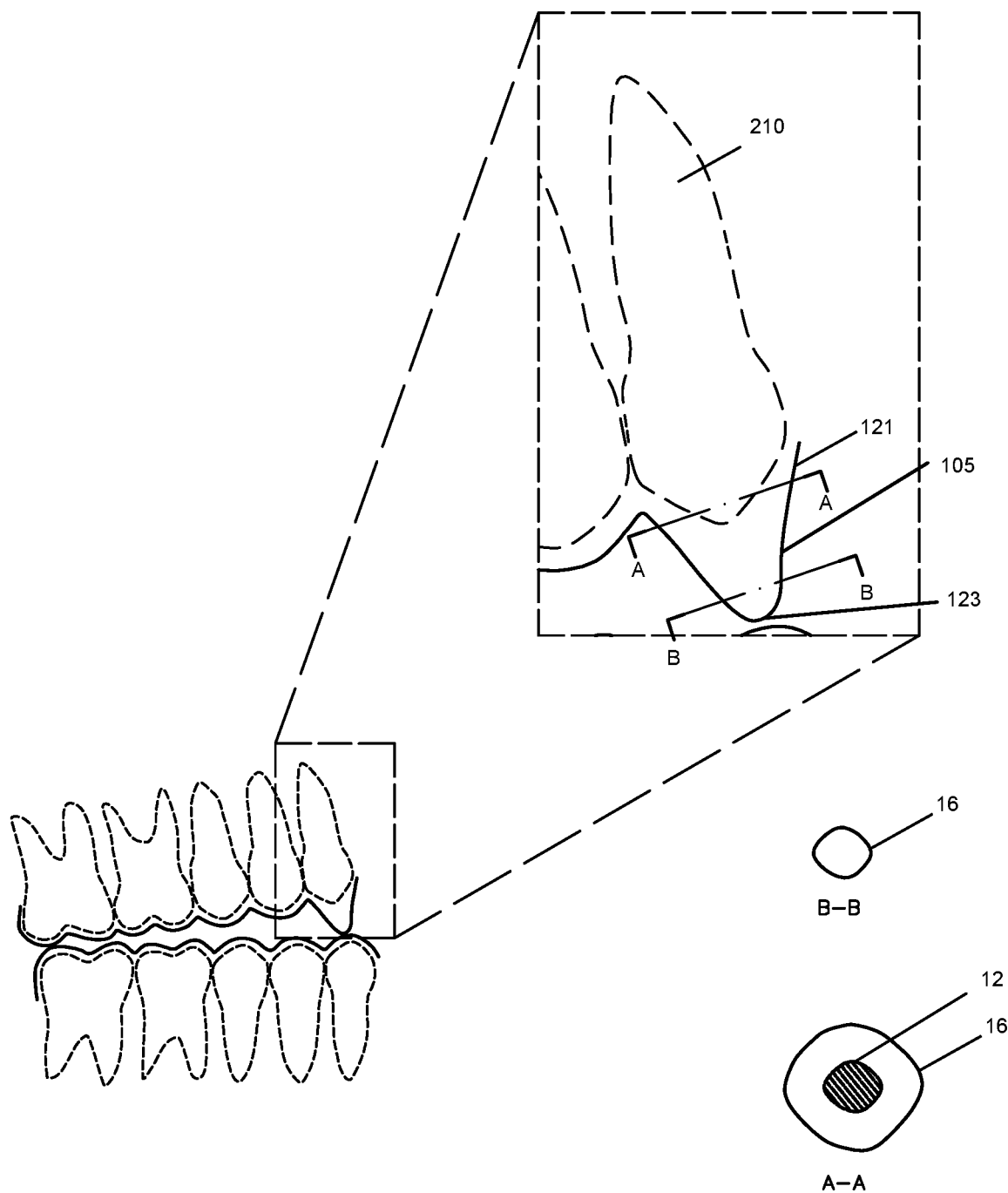
FIG. 4 is a vertical sectional view of part of a dentition, showing a first cross-section A-A and a second cross-section B-B of a bulge applied over an upper canine.

FIG. 4 is a vertical cross section view of part of a dentition and a magnified view of a bulge 105, showing two cross-sections of the bulge 105. Upper and lower aligners 16 are fully installed. The bulge 105 is applied over an incisal edge of upper right canine 210. In some cases, a bulge may be applied over lower canines. The cross-section A-A is made at the base 121 of the bulge 105. The cross-section B-B is made at the distal end 123 of the bulge 105. The cross-section A-A has greater area than the cross-section B-B. The bulge 105 has a shape similar to a natural tooth cusp, the bulge 105 may have a size similar to a natural tooth cusp or may have a greater size than a natural tooth cusp. An area of a cross section of the bulge 105 become smaller gradually from a base 121 of the bulge 105 to a distal end 123 of the bulge 105. The distal end 123 of the bulge 105 has contact with the lower aligner 16 when the fully installed aligners make contact. A cusp-shaped bulge 105 has better contact with the biting wall 124 of the opposite aligner 16. The bulge 105 in this application may be applied with other shapes, and a cusp-shaped bulge is one of the preferred embodiments. The bulge may have any shape according to the treatment requirement, for example a shape like an incisal edge.

Figure 5:
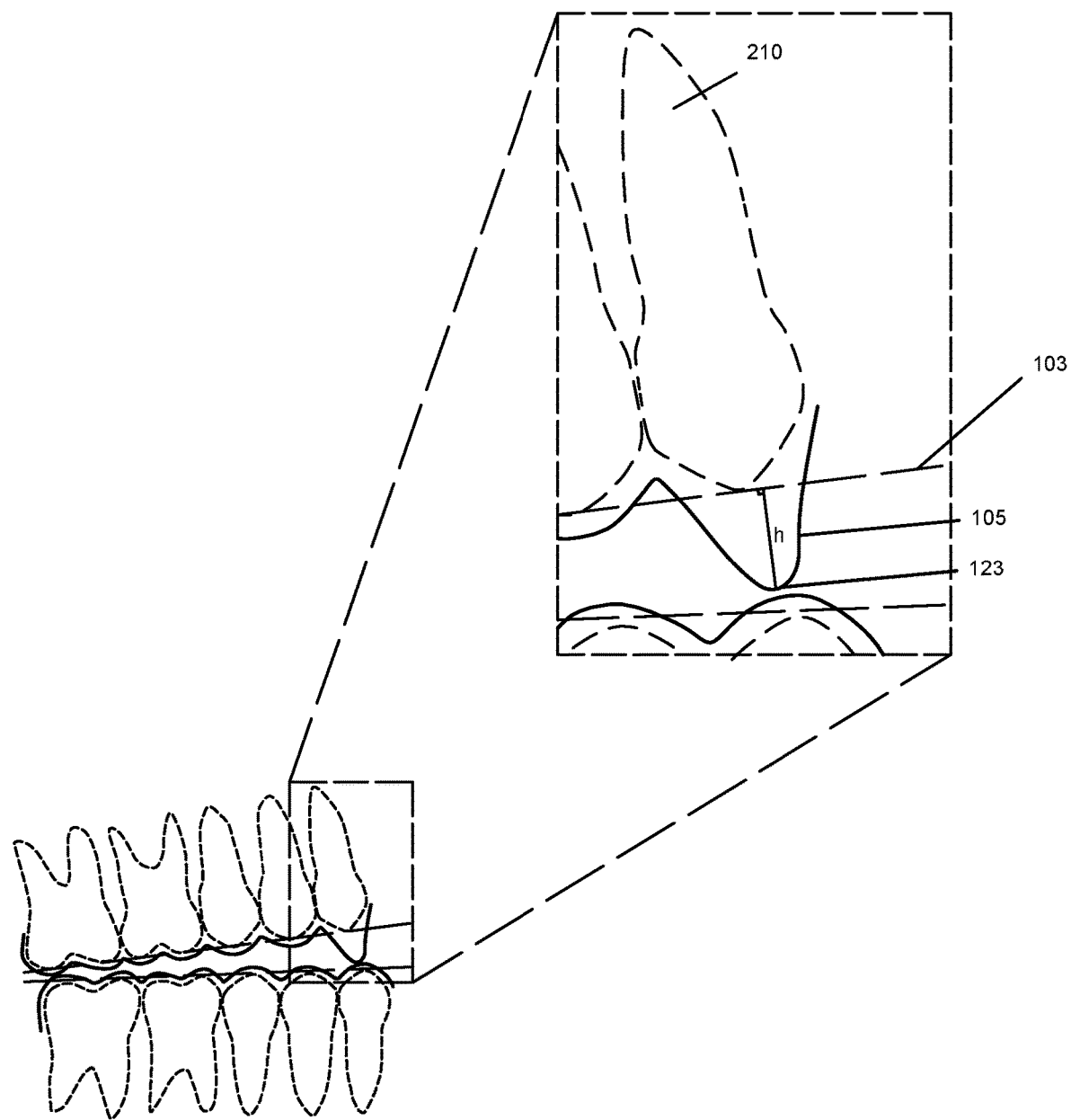
FIG. 5 is a vertical sectional view of part of a dentition, showing a height of a bulge.

FIG. 5 is a vertical cross section view of part of a dentition and a magnified view of a bulge 105 over tooth 210, showing a height h of the bulge 105. Upper and lower aligners 16 are fully installed. The height of the bulge 105 is the distance from a distal end 123 of the bulge 105 to the occlusal plane 103.

Figure 6:
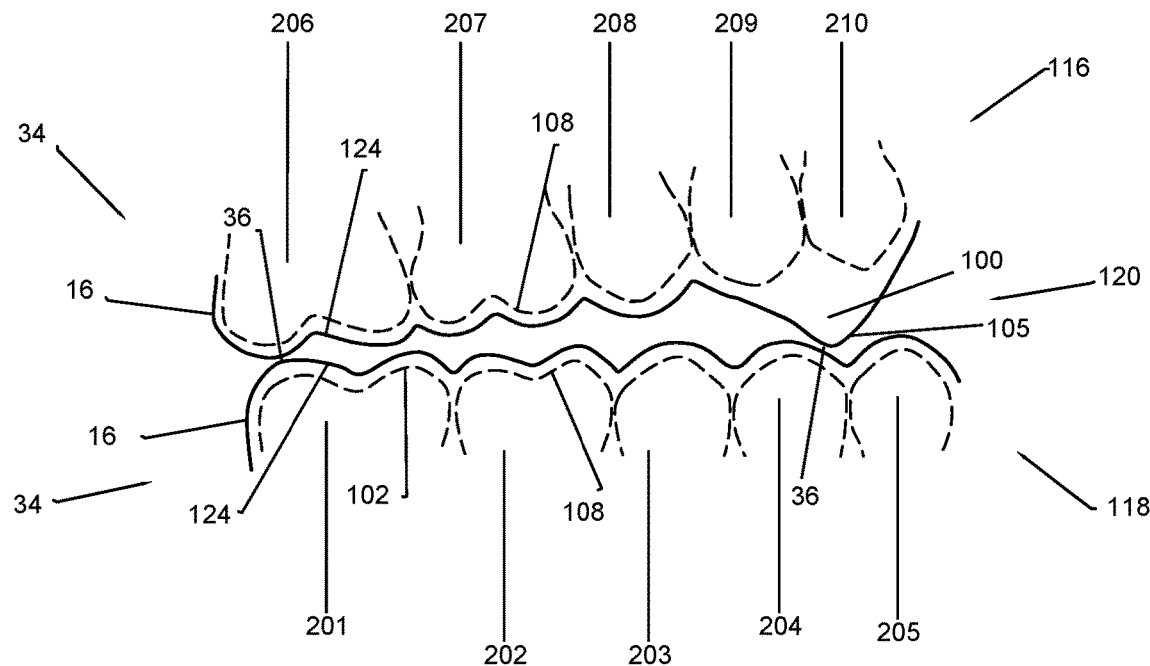
FIG. 6 is a vertical sectional view of part of a dentition, showing a variation of the first embodiment.

FIG. 6 is a vertical cross section view of part of a dentition, showing part of the right side of the dentition. Upper and lower aligners 16 are fully installed. In this embodiment, the bulge 105 is formed extending over tooth 210 and tooth 209. A bulge space 100 is formed between the bulge 105 and the tooth surface of tooth 210 and tooth 209. The bulge 105 has a shape similar to a natural tooth cusp. The bulge 105 covers part of the occlusal surface 108 of tooth 209 and the tooth cusp of tooth 210. The bulge 105 has a contact point 36 with the lower aligner 16.

Figure 7:
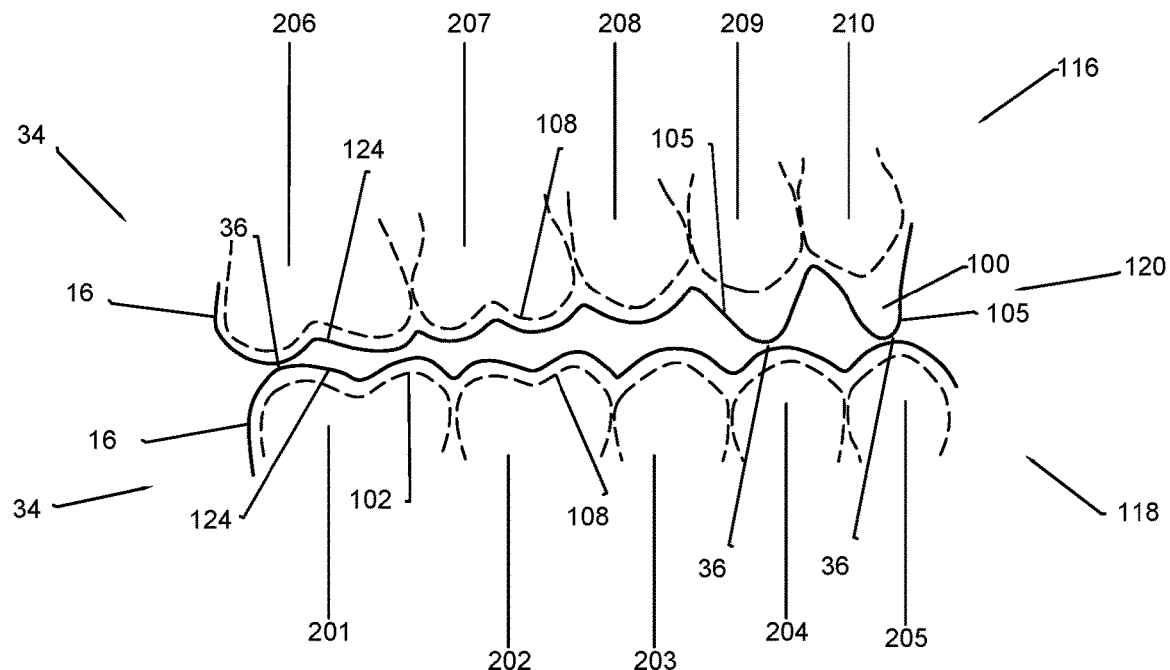
FIG. 7 is a vertical sectional view of part of a dentition according to a second embodiment, showing two bulges applied over right side of the aligners.
Figure 8:
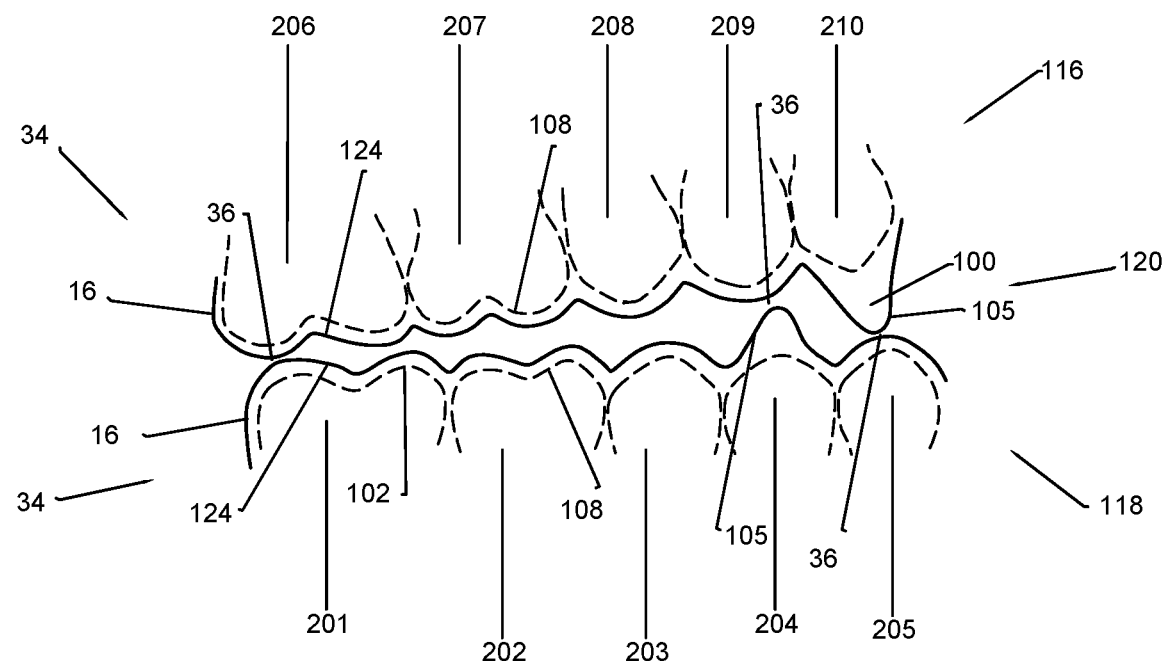
FIG. 8 is a vertical sectional view of part of a dentition, showing a variation of the second embodiment.
Figure 9:
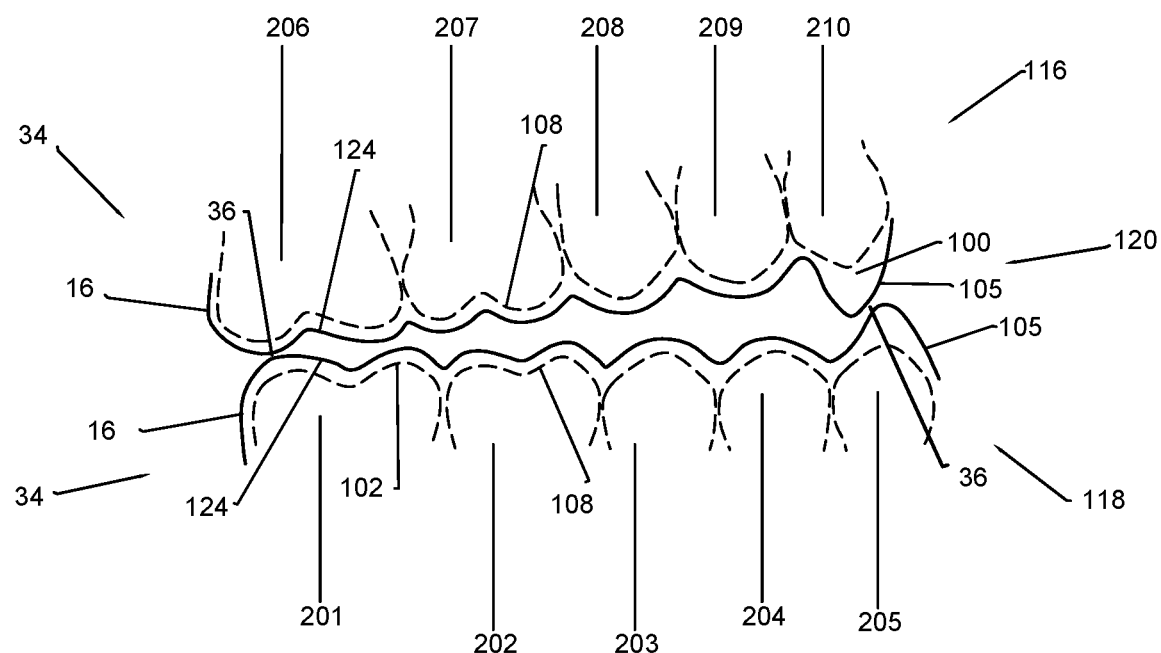
FIG. 9 is a vertical sectional view of part of a dentition, showing a variation of the second embodiment.

FIGS. 7, 8 and 9 are vertical cross section views of part of a dentition, showing part of the right side of the dentition. An upper aligner 16 and a lower aligner 16 are in fully installed position 34. FIG. 7 shows that two bulges 105 are applied at the right side of the upper aligner 16, one bulge 105 is applied over upper canine 210 and one bulge 105 is applied over upper first premolar 209. In this case, two bulges 105 are applied at both right side and left side of the upper aligner 16. In some cases, two bulges 105 may be applied at both right side and left side of the lower aligner 16, one at anterior teeth and one at premolars. FIG. 8 shows that one bulge 105 is applied over upper canine 210 and one bulge 105 is applied lower first premolar 204, but these two bulges have no occlusal contact with each other. FIG. 9 shows one bulge 105 applied over the upper canine 210 and one bulge 105 applied over the lower canine 205, and these two bulges have occlusal contact 36 with each other. In FIG. 7, the bulge 105 over the canine 210 is higher than the bulge 105 over the first premolar 209, and the distal end of these two bulges 105 contact the lower aligner 16. In FIG. 8, the bulge 105 over the canine 210 is higher than the bulge 105 over the first premolar 204, the distal end of each one of the bulges 105 has contact with the opposite aligner 16. In all these figures, a wedge-shaped space 120 is maintained between the occlusal surfaces 108 of the upper posterior teeth and the lower posterior teeth when the upper aligner 16 has contact with the lower aligner 16. The bulge 105 over the canine may cover the incisal edge and the buccal surface of the canine.

Figure 10:
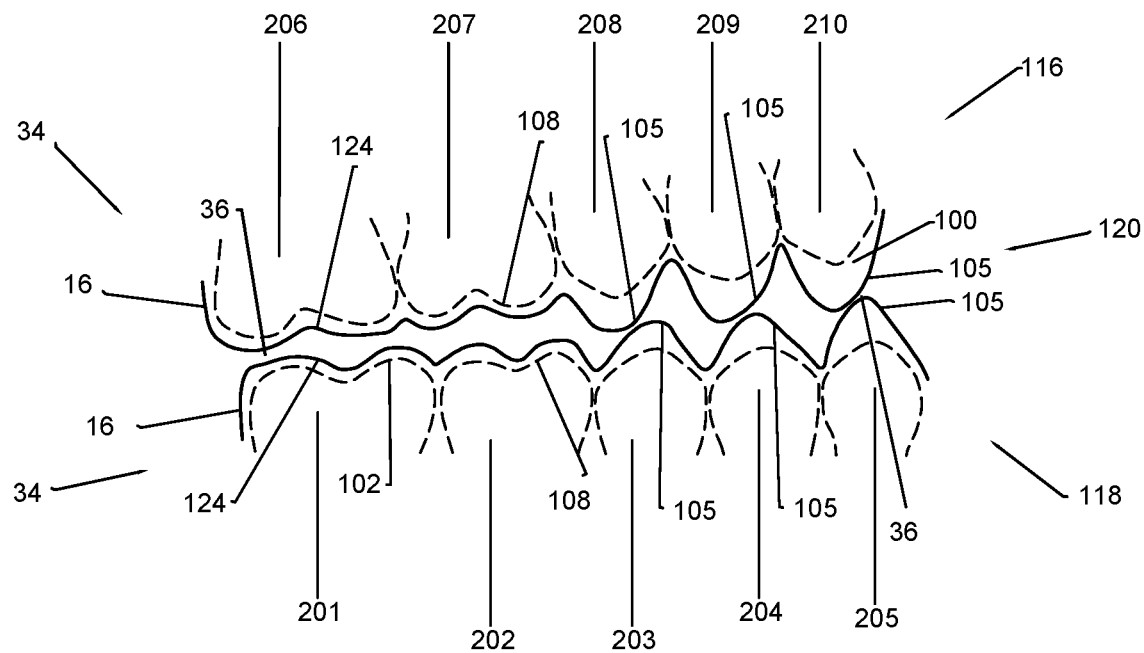
FIG. 10 is a vertical sectional view of part of a dentition according to a third embodiment, showing six bulges applied at right side of the aligners.

FIG. 10 is a vertical cross section view of part of a dentition, showing part of the right side of the dentition. An upper aligner 16 and a lower aligner 16 are in fully installed position 34. One bulge 105 is applied over the tooth 210, and one bulge 105 is applied over the tooth 209, one bulge 105 is applied over the tooth 208, and one bulge is applied over the tooth 205, one bulge 105 is applied over the tooth 204, and one bulge 105 is applied over the tooth 203. These bulges 105 are applied over functional cusps of the teeth. The bulge 105 over the canine 205 is higher than the bulges 105 over the premolar 204 and premolar 203. The bulges 105 over functional cusps are gradually become higher from posterior teeth to anterior teeth. Spaces 100 are formed between the bulges 105 and the tooth surfaces. The bulge is dimensioned and positioned to maintain a wedge-shaped space between occlusal surfaces of the upper posterior teeth and the lower posterior teeth when the fully installed aligners make contact, and this wedge-shaped space is greater at premolars than molars.

Figure 11:
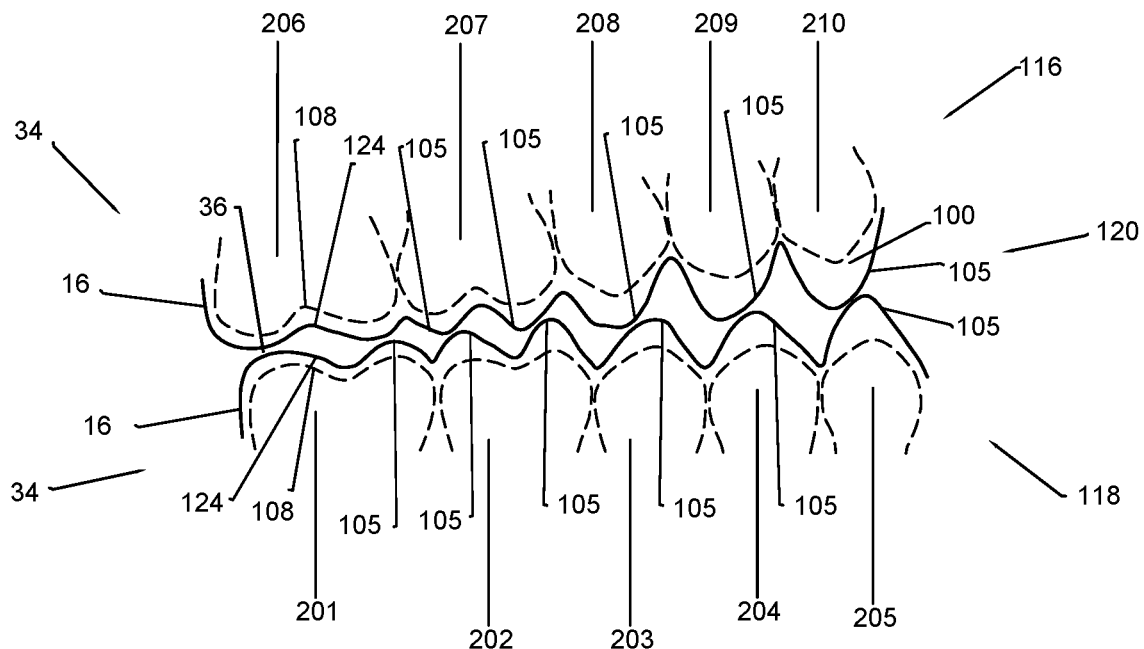
FIG. 11 is a vertical sectional view of part of a dentition according to a fourth embodiment, showing eleven bulges applied at right side of the aligners.

FIG. 11 is a vertical cross section view of part of a dentition, showing part of the right side of the dentition. An upper aligner 16 and a lower aligner 16 are in fully installed position 34. One bulge 105 is applied over the tooth 210, one bulge 105 is applied over the tooth 209, one bulge 105 is applied over the tooth 208, and two bulges 105 are applied over the tooth 207, and one bulge is applied over the tooth 205, and one bulge 105 is applied over the tooth 204, and one bulge 105 is applied over the tooth 203, and two bulges are applied over the tooth 202, and one bulge 105 is applied over the mesial cusp of the tooth 201. These bulges 105 are applied over functional cusps of the teeth. The bulges 105 over the premolar 208 and premolar 209 are higher than the bulges 105 over the molar 207. The bulges 105 over the premolar 204 and the premolar 203 are higher than the bulges 105 over the molar 202 and molar 201.

The bulges 105 are dimensioned and positioned to maintain a wedge-shaped space 120 between an occlusal surface of the upper posterior teeth and an occlusal surface of the lower posterior teeth when the lower aligner 16 has contact with the upper aligner 16, and this wedge-shaped space 120 is greater at premolars than molars. The bulge 105 is dimensioned to have contact with the opposite aligner when the fully installed aligners make contact. No limitation on quantity of bulges, we can apply as many bulges on an aligner as a treatment need.

In dentistry, centric relation is a relationship of the mandible to the maxilla irrespective of vertical dimension or tooth position. Centric relation is the mandible jaw position in which the head of the condyle is situated as far anterior and superior as it possibly can within the mandibular fossa. Eccentric relation is the relation of the mandible to the maxilla other than centric relation. All the embodiments in this application may be applied when the mandible is in centric relation; all the embodiments may also be applied when the mandible is in eccentric relation.

To maintain the wedge-shaped space 120, bulges 105 at the biting wall of the aligners should be applied. A distal end 123 of each one of the bulges 105 at one of the aligners is dimensioned to have contact with the other aligner when the fully installed aligners make contact; In some cases at least one bulge over first premolars and canines of the teeth is applied at the right side of the aligners and at least one bulge over first premolars and canines is applied at the left side of the aligners; in some case at least two bulges are applied at the left side of the aligners and at least two bulges are applied at the right side of the aligners, and the anterior bulge is higher than the posterior bulge.

A bulge 105 of an aligner 16 applied over lower canines should be taller than a bulge 105 of that aligner applied over lower premolars, and a bulge 105 of that aligner 16 applied over premolars should be taller than a bulge 105 of that aligner applied over molars; in some cases, a bulge 105 over an incisal edge of lower incisors may be applied and this bulge 105 may be the tallest bulge in this aligner. If the wedge-shaped space 120 between the occlusal surfaces of the upper posterior teeth and the lower posterior teeth is maintained by the upper and lower aligners 16 which have the bulges 105 with different heights at different location, premature contact between the aligners over the last molar can be prevented, such that undesirable molar intrusion and open bite at molar region could be prevented. While taking off the aligners the upper dental arch and lower dental arch may also have good occlusal contact at most of the back teeth, and one of the orthodontic treatment aims is to reach maximal intercuspation in harmony with centric relation. Another advantage of this arrangement is that the occlusal force is much more evenly distributed to different parts of the aligners and keep the whole aligners in a fully installed position. A functional cusp refers to a tooth cusp that occlude with the opposing teeth in centric occlusion. In normal occlusion, the lingual cusps of the upper posterior teeth and the buccal cusps of the lower posterior teeth are functional cusps. A non-functional cusp refers to a tooth cusp that do not occlude with the opposing teeth in centric occlusion. In normal occlusion, the lingual cusps of the lower posterior teeth and the buccal cusps of the upper posterior teeth are non-functional cusps. In a deep overbite case, a bulge 105 may be applied over anterior teeth. In an anterior open bite case, bulges 105 may be applied at posterior teeth only.

When the space 120 occupied by the aligners 16 is equal to or a little greater than the Interocclusal rest space when the aligners 16 is fully installed, a relatively continuous contact between the two aligners may be maintained; in this situation if only the anterior parts of the aligners have contact with each other the anterior teeth may receive continuous intrusive force and deep overbite may be relieved; if only the posterior parts of the aligners have contact with each other the back teeth may receive continuous intrusive force and anterior teeth open bite may be relieved.

All the bulges 105 are dimensioned to have contact 36 with the opposite aligner 16 when the aligners have contact with each other.

Figure 12:
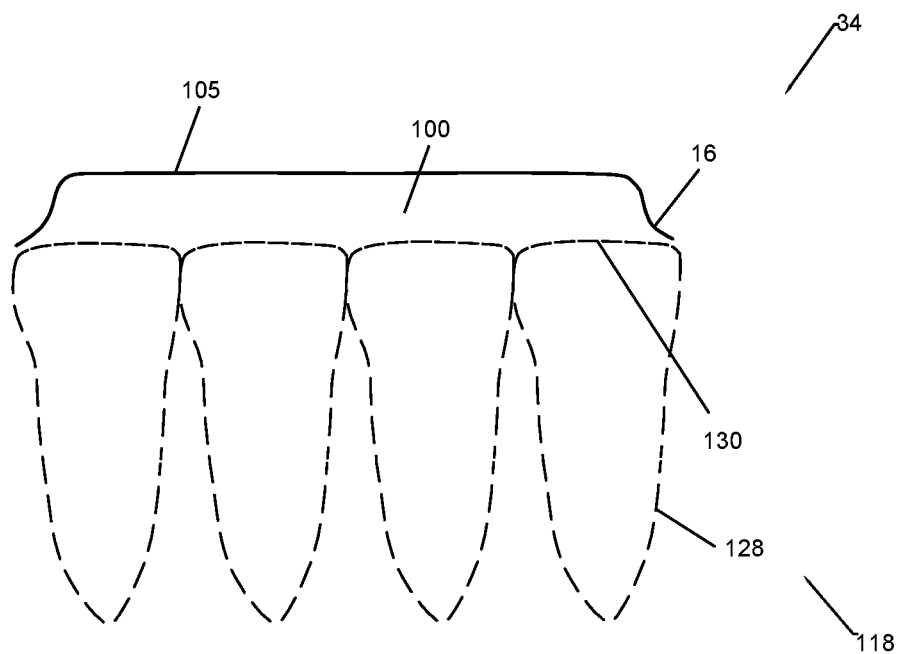
FIG. 12 is a vertical sectional view of part of a dentition according to a fifth embodiment, showing one bulge applied around the incisal edge of four incisors.

FIG. 12 is a vertical sectional view of part of a lower dentition 118 according to a fifth embodiment, showing one bulge 105 is applied around the incisal edges 130 of four lower incisors 128 when an aligner 16 is in fully installed position 34. A bulge space 100 is formed between the bulge 105 and the incisal edge 130.

Figure 13:
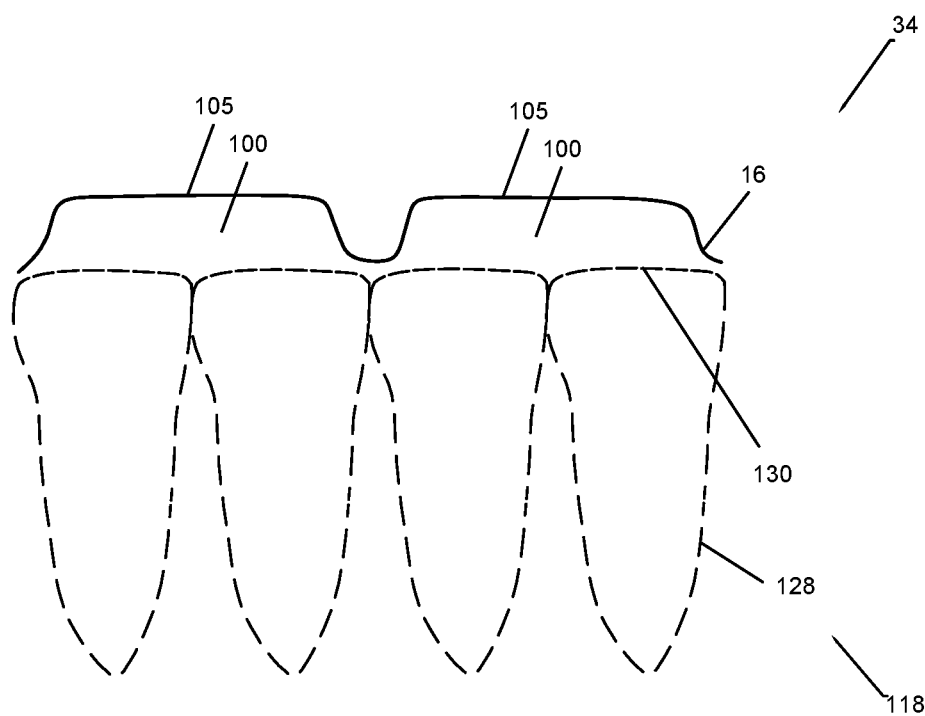
FIG. 13 is a vertical sectional view of part of a dentition according to a sixth embodiment, showing two bulges applied around the incisal edge of four incisors.

FIG. 13 is a vertical sectional view of part of a lower dentition 118 according to a sixth embodiment, showing two bulges 105 are applied around the incisal edges 130 of four lower incisors 128 when an aligner 16 is in fully installed position 34, each bulge 105 covers the incisal edges of two lower incisors. A bulge space 100 is formed between the bulge 105 and the incisal edge 130.

Figure 14:
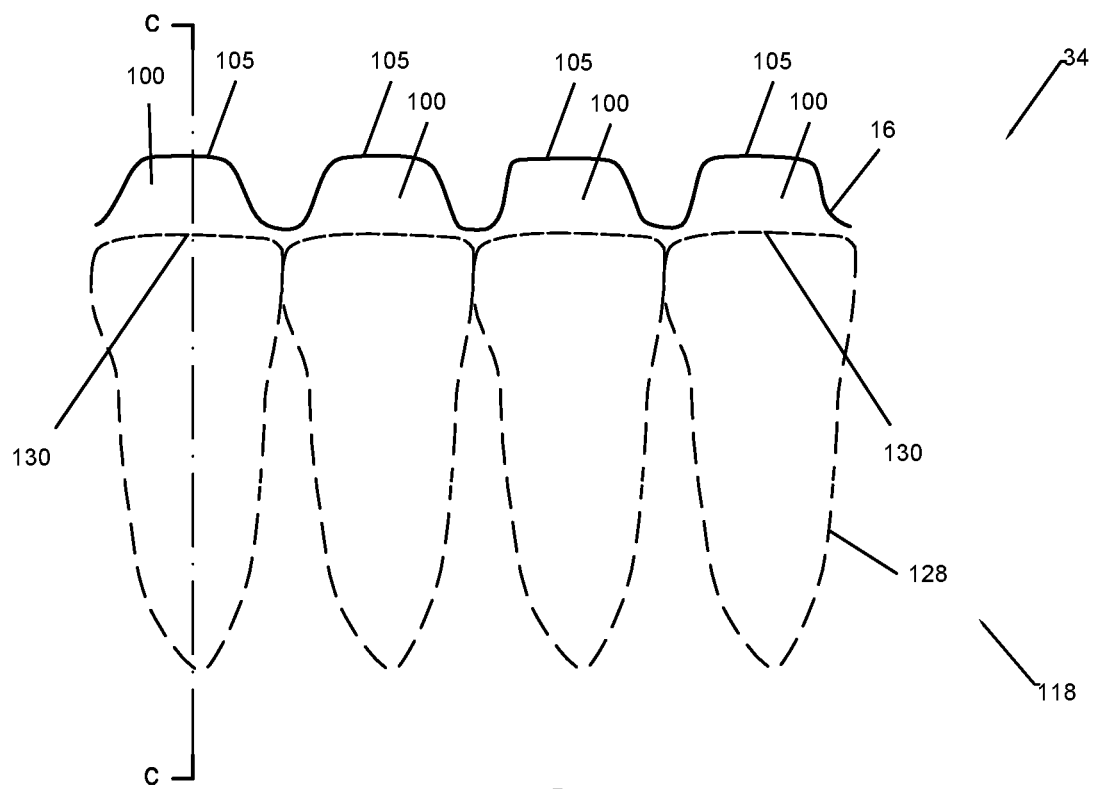
FIG. 14 is a vertical sectional view of part of a dentition according to a seventh embodiment, showing four bulges applied around the incisal edge of four incisors.

FIG. 14 is a vertical sectional view of part of a lower dentition 118 according to a seventh embodiment, showing four bulges 105 are applied around the incisal edges 130 of four lower incisors 128 when an aligner 16 is in fully installed position 34, each bulge 105 covers the incisal edge of one lower incisor. A bulge space 100 is formed between the bulge 105 and the incisal edge 130. The bulge 105 has a shape like an incisal edge 130.

Figure 15:
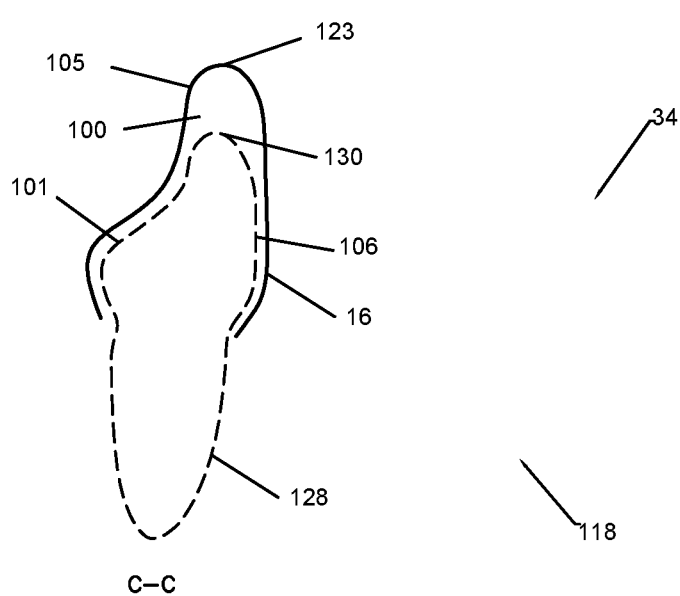
FIG. 15 is a side sectional view along line C-C of the part of the dentition shown in FIG. 14.

FIG. 15 is a side sectional view C-C of the part of the lower dentition 118 shown in the FIG. 14, showing a bulge space 100 is between the bulge 105 and the incisal edge 130. A height of the bulge 105 refers to the distance from the distal end 123 of the bulge 105 to the occlusal plane of the lower dental arch 118, in this figure the height of the bulge 105 is the same as the distance from the distal end 123 to the incisal edge 130 of the tooth 128. The bulge 105 formed over the incisal edge 130 also covers part of a buccal surface 106 of the tooth 128. A receiving space 101 defined by the aligner 16 is completely occupied by the crown of tooth 128 when the aligner 16 is in fully installed position 34, and the bulge space 100 is left between the bulge 105 and the tooth 128 when the aligner 16 is in fully installed position 34. The bulge space 100 is also between the bulge 105 and the receiving space 101.

Figure 16:
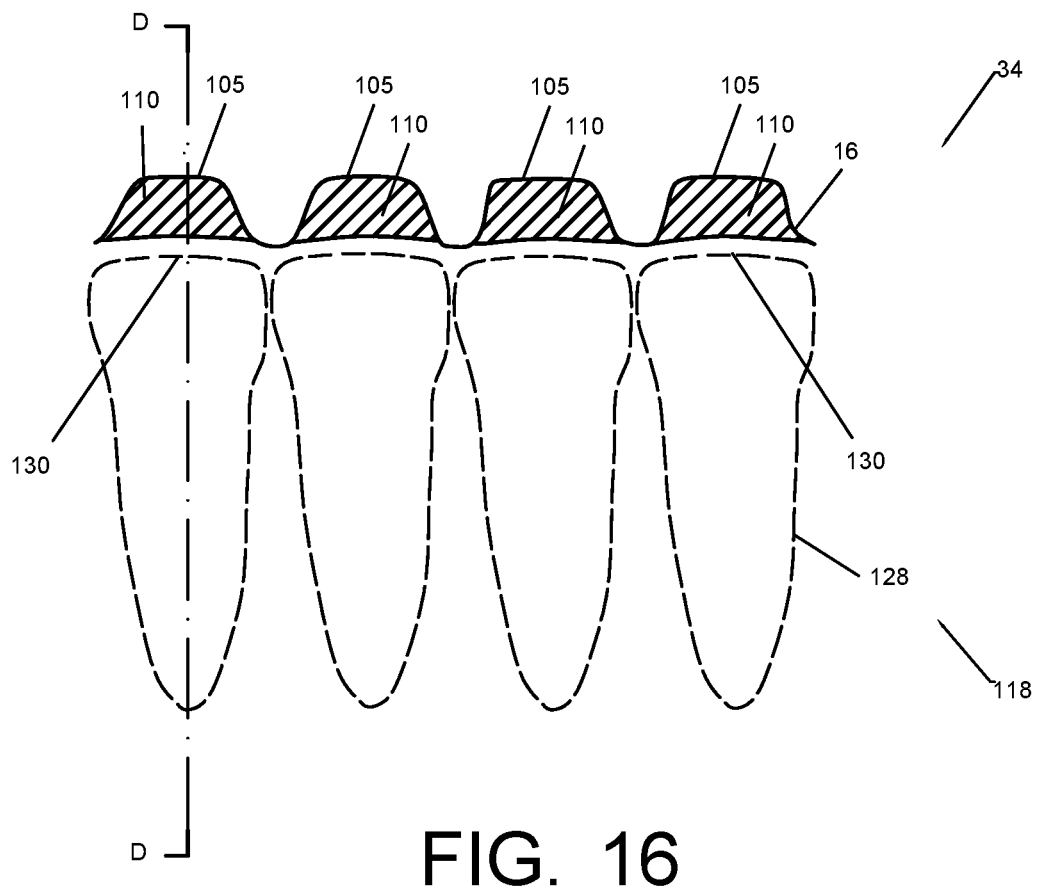
FIG. 16 is a vertical sectional view of part of a dentition, showing a variation of the seventh embodiment.

FIG. 16 is a vertical sectional view of part of a lower dentition 118, showing a variation of the seventh embodiment. Four bulges 105 are applied around the incisal edges 130 of four lower incisors 128 when an aligner 16 is in fully installed position 34, each bulge 105 covers an incisal edge 130 of one lower incisor 128. A space formed between the bulge 105 and the incisal edge 130 is filled with a filling material 110, this filling material 110 may be composite or impression material, or any material which is permitted to be filled into the bulge space 100, this material 110 may be attached with the aligner 16. This filling material 110 may also be another layer of aligner material.

Figure 17:
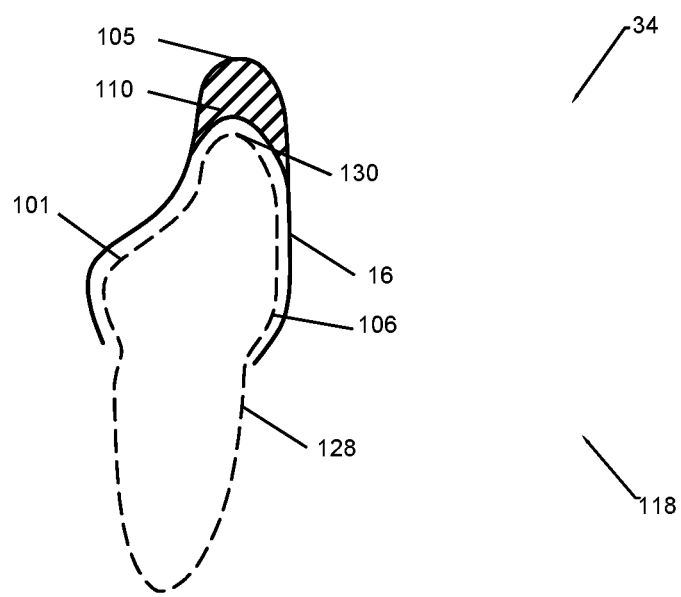
FIG. 17 is a side sectional view along line D-D of the part of the dentition shown in FIG. 16.

FIG. 17 is a side sectional view D-D of the part of the lower dentition 118 shown in the FIG. 16, showing the bulge space between the bulge 105 and the incisal edge 130 is occupied by a filling material 110 when the aligner 16 is in fully installed position 34. The space between the bulge 105 and the receiving space 101 is filled with a filling material 110.

In some cases, a bulge may cover part of an incisal edge of one anterior tooth; in some cases, a bulge may cover any part of an incisor edge of the anterior teeth of one dental arch; in some cases, a bulge may cover an incisal edge of all the upper or lower anterior teeth.

In some cases, one or more bulge is applied over an incisal edge of lower anterior teeth of the teeth; in some cases, one or more bulge is applied over an incisal edge of upper anterior teeth of the teeth; In some cases, the bulges are applied over an incisal edge of upper anterior teeth and lower anterior teeth. The bulge is dimensioned and positioned to maintain a wedge-shaped space between occlusal surfaces of the upper posterior teeth and the lower posterior teeth when the fully installed aligners make contact, and this wedge-shaped space is greater at premolars than molars.

A bulge 105 over an incisal edge may have a shape like an incisal edge or a tooth cusp. The bulge 105 may have any shape according to the orthodontic treatment requirement.

Figure 18:
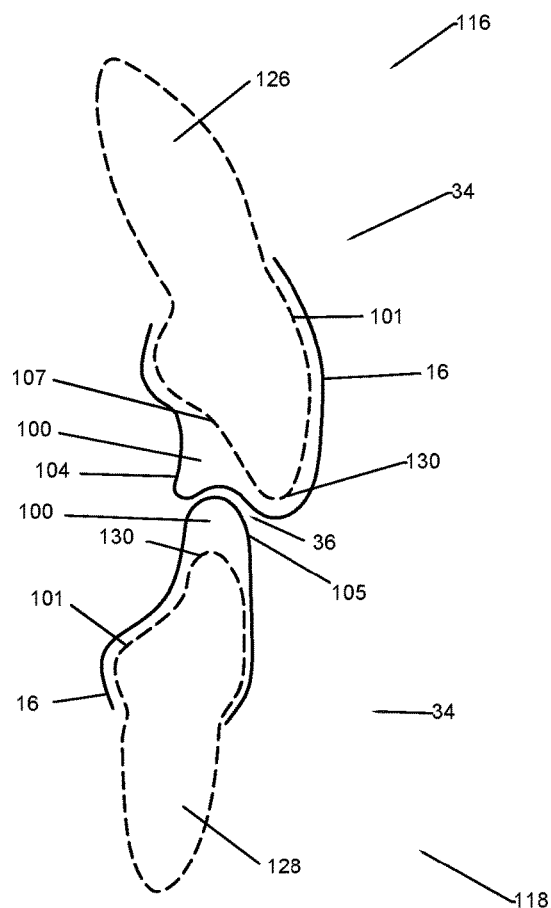
FIG. 18 is a vertical sectional view of the incisors of a dentition according to an eighth embodiment, showing a bite ramp applied at a lingual surface of an upper incisor and a bulge applied around a lower incisal edge.

FIG. 18 is a vertical sectional view of part of a dentition according to an eighth embodiment, showing that a bite ramp 104 of an upper aligner is applied at a lingual surface of the upper incisor 126 in the upper dental arch 116 and a bulge 105 of a lower aligner is applied around an incisal edge 130 of the lower incisor 128 in the lower dental arch 118 when the upper and lower aligners 16 are in fully installed position 34. The receiving space 101 is fully occupied by the crown of the tooth 128. The lower bulge 105 has good contact 36 with the upper aligner bite ramp 104. In this situation, this contact 36 between the upper and lower aligners 16 generates force, this force is an intrusion force working on the upper and lower anterior teeth, and this arrangement can help to correct the deep overbite at anterior teeth. This arrangement is also helpful to maintain the normal occlusal relationship of upper and lower dentitions and inhibit aligners displacement. The bulge is dimensioned and positioned to maintain a wedge-shaped space between occlusal surfaces of the upper posterior teeth and the lower posterior teeth when the fully installed aligners make contact, and this wedge-shaped space is greater at premolars than molars. When a bulger of a lower aligner is applied together with a bite ramp of an upper aligner in a deep bite patient, the height of the bulge may be shorter than a bulge applied over premolars.

Figure 19:
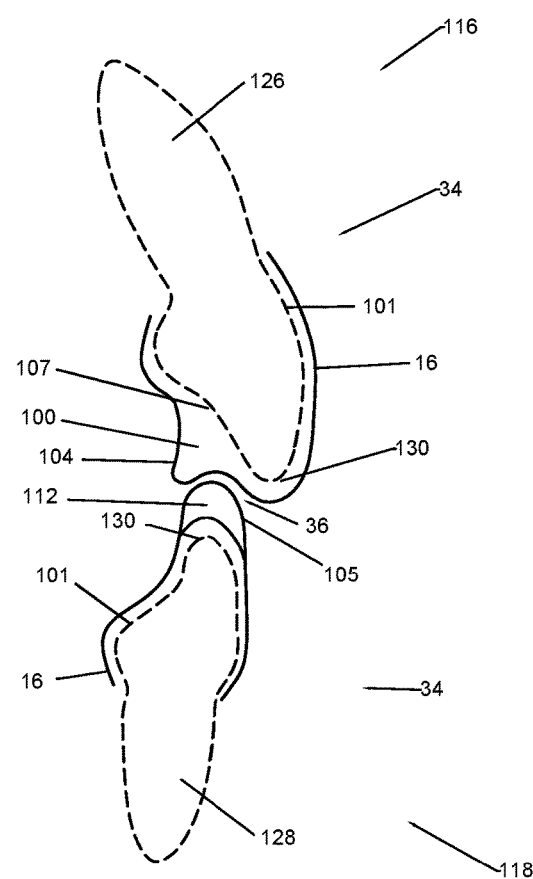
FIG. 19 is a vertical sectional view of the incisors of a dentition, showing a variation of the eighth embodiment.

FIG. 19 is a vertical sectional view of part of a dentition, showing a variation of the eighth embodiment, showing that an aligner bite ramp 104 over a space is applied at a lingual surface of the upper incisor 126 in the upper dental arch 116; a part of the lower aligner 16 over an incisal edge 130 of the lower incisor 128 has greater thickness 112 than other part of the biting wall of the lower aligner 16, such that a bulge 105 is applied over the incisal edge 130 of the lower incisor 128 in the lower dental arch 118 when the upper and lower aligners are in fully installed position 34. The lower bulge 105 has good contact 36 with the upper aligner bite ramp 104. In some cases, the aligner bite ramp 104 may also be formed by employing aligner material with greater thickness 112 than other part of the upper aligner 16. In all the embodiments in this application, the bulge of an aligner may be formed by the aligner material which is thicker than other part of the aligner, and the bite ramp of an aligner may also be formed with the aligner material which is thicker than other part of the aligner. The aligner bulge 105 with greater thickness 112 may be applied in the other part of the biting wall 124 of the aligner; usually the aligner bulge 105 may be applied over the premolars and the anterior teeth when the aligners are fully installed, especially the first premolars. The bulge 105 with great thickness 112 may also be applied at the biting wall 124 of the retainers 18; usually the retainer bulge 105 may be applied over the premolars and the anterior teeth when the retainers 18 are fully installed, especially the first premolars.

All the bulge at the bite wall of the aligners in the embodiments of this application may be formed with greater thickness of aligner material. Part of the biting wall of the aligners is thicker than other parts of the biting wall, such that at least one bulge is formed at the biting wall; the at least one bulge is dimensioned and positioned to maintain a wedge-shaped space between occlusal surfaces of the upper posterior teeth of the teeth and the lower posterior teeth of the teeth when the aligners are fully installed and have contact with each other, and the wedge-shaped space is greater at premolars of the teeth than molars of the teeth.

Figure 20:
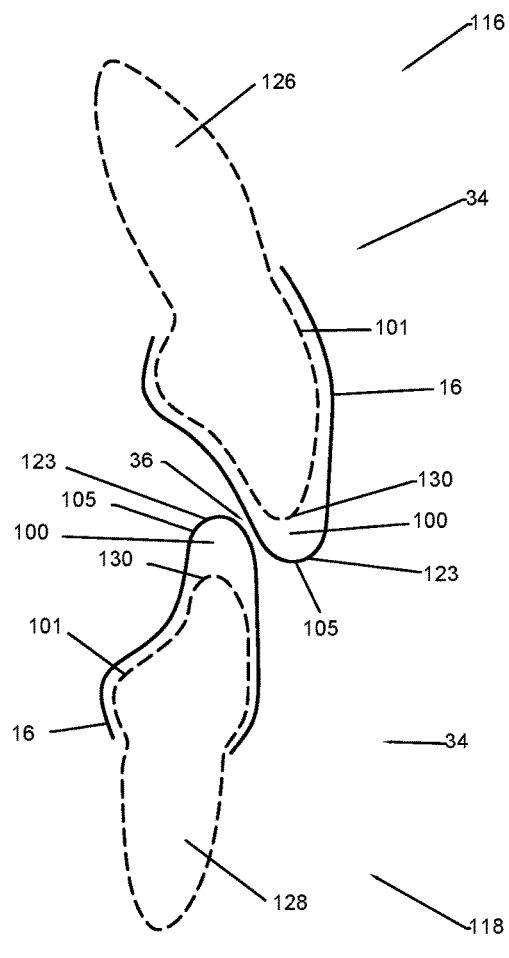
FIG. 20 is a vertical sectional view of the incisors of a dentition according to a ninth embodiment, showing a bulge applied around an upper incisal edge and a bulge applied around a lower incisal edge.

FIG. 20 is a vertical sectional view of part of a dentition according to a ninth embodiment, showing a bulge 105 applied over an incisal edge 130 of the upper incisor 126 in the upper dental arch 116 and a bulge 105 applied over an incisal edge 130 of the lower incisor 128 in the lower dental arch 118 when the upper and lower aligners 16 are in fully installed position 34 and make contact 36. The distal end 123 of the lower bulge 105 has contact 36 with the lingual surface of the upper aligner 16. The bulge 105 is dimensioned to maintain a wedge-shaped space 120 between an occlusal surface of the upper posterior teeth and an occlusal surface of the lower posterior teeth when the lower aligner 16 has contact with the upper aligner 16, and this wedge-shaped space 120 is greater at premolars than molars.

Figure 21:
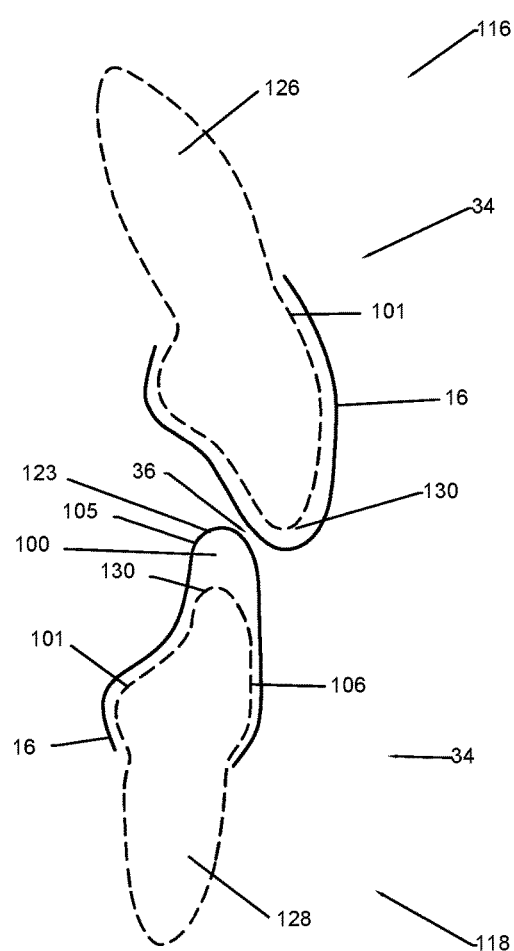
FIG. 21 is a vertical sectional view of the incisors of a dentition, showing a variation of the ninth embodiment.

FIG. 21 is a vertical sectional view of part of a dentition, showing a bulge 105 applied over an incisal edge 130 of the lower incisor 128 in the lower dental arch 118 when the upper and lower aligners 16 are in fully installed position 34. The distal end 123 of the lower bulge 105 has contact 36 with the lingual surface of the upper aligner 16.

Figure 22:
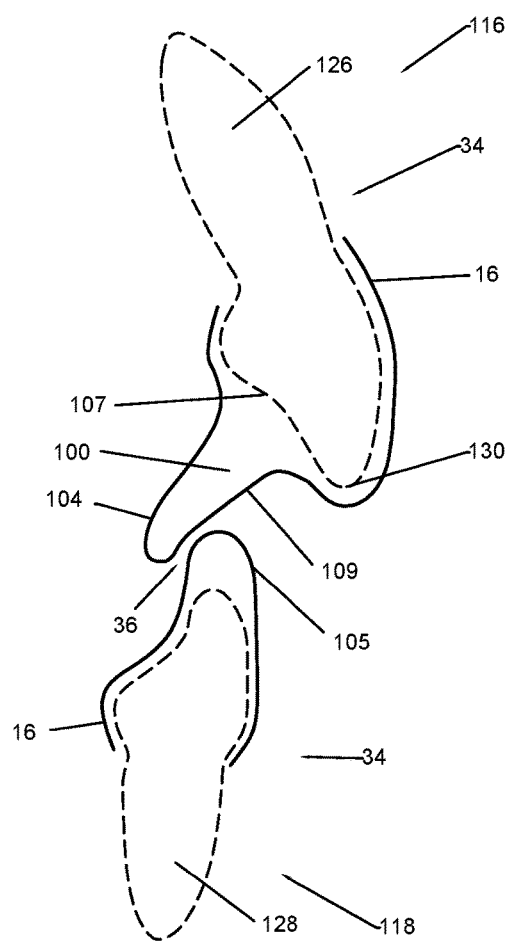
FIG. 22 is a vertical sectional view of the incisors of a dentition according to a variation of the eighth embodiment, showing the bite ramp comprising a guiding surface.

FIG. 22 is a vertical sectional view of part of a dentition, showing an aligner bite ramp 104 of the upper aligner applied at a lingual surface 107 of the upper incisor 126 and a bulge 105 of the lower aligner applied over an incisal edge 130 of the lower incisor 128 when the upper and lower aligners 16 are in fully installed position 34 and make contact 36. The bite ramp 104 comprises a guiding surface 109 facing down and forward, and a distal end of the bulge 105 is permitted to slide forward and upward on the guiding surface 109 of the aligner bite ramp 104. The distal end 123 of the bulge 105 has contact 36 with the guiding surface 109 of the aligner bite ramp 104. The bulge 105 and the bite ramp 104 are dimensioned to guide the mandible forward by urging the distal end of the bulge 105 to slide forward and upward on the guiding surface 109 when the patient close his mouth. This arrangement is very helpful to correct AP position in class II cases of young children.

Figure 23:
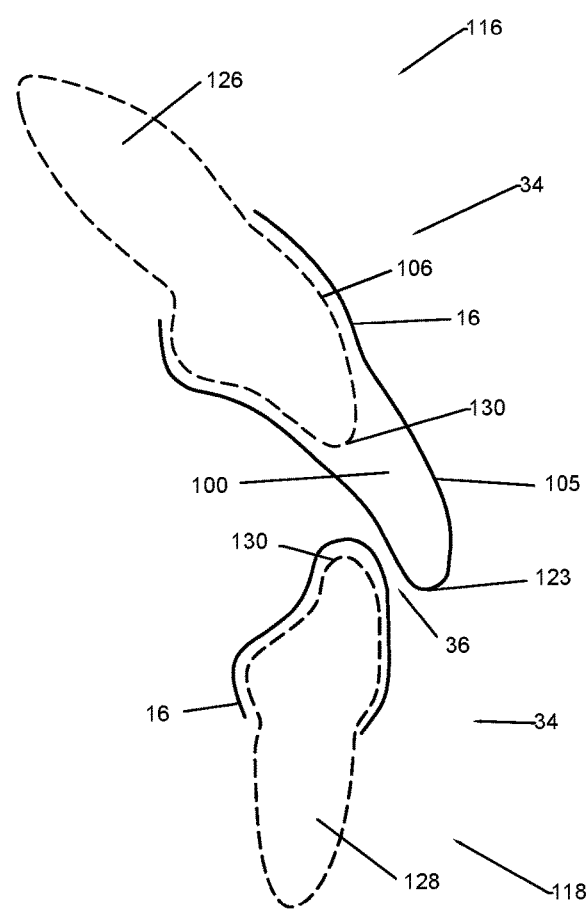
FIG. 23 is a vertical sectional view of the incisors of a dentition, showing a variation of the ninth embodiment.

FIG. 23 is a vertical sectional view of part of a dentition, showing a bulge 105 of upper aligner applied over an incisal edge 130 of the upper incisor 126 in the upper dental arch 116 when the upper and lower aligners 16 are in fully installed position 34. The bulge 105 also covers part of a buccal surface 106 of the tooth 126. A bulge space 100 is formed between the bulge 105 and the incisal edge 130. The lower aligner 16 has contact 36 with a lingual surface of the upper bulge 105. A wedge-shaped space is maintained between the occlusal surfaces of the upper posterior teeth and the lower posterior teeth when the fully installed aligners 16 make contact. This embodiment may be applied in class III malocclusion patient. In some cases, a bulge 105 may also be added over the incisal edge 130 of lower incisors 128.

An aligner bulge may be extended to cover part of at least one of a buccal surface and a lingual surface of the teeth.

Figure 24:
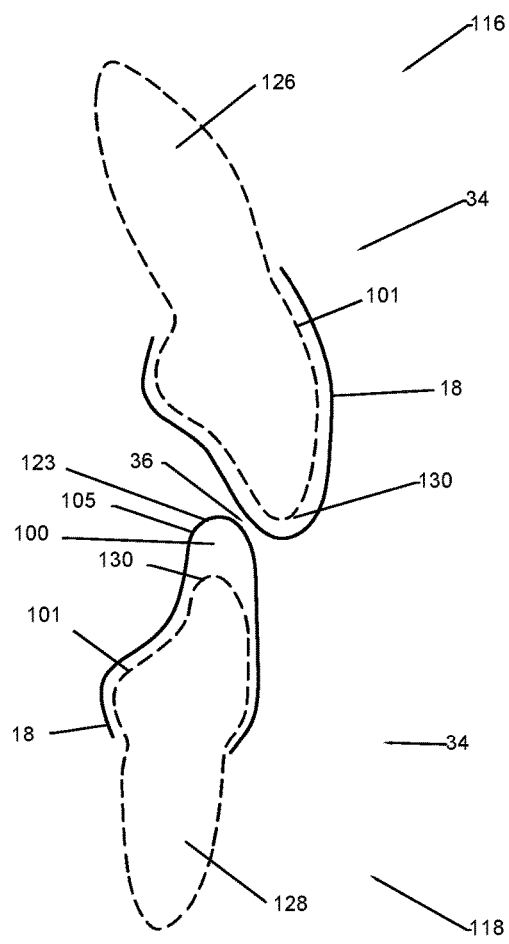
FIG. 24. is a vertical sectional view of the incisors of a dentition according to a tenth embodiment, showing a bulge applied around a lower incisal edge at the lower retainer.

FIG. 24 is a vertical sectional view of part of a dentition, showing a bulge 105 of a lower retainer 18 applied over a lower incisal edge 130 of a lower incisor 128 when the upper and lower retainer 18 are in fully installed position 34. The receiving space 101 is fully occupied by the crowns of the teeth. A bulge space 100 is formed between the bulge 105 and the incisal edge 130. The distal end 123 of the bulge 105 of the lower retainer 18 has contact 36 with a lingual surface of the upper retainer 18. The bulge 105 is dimensioned to maintain a wedge-shaped space between occlusal surfaces of the upper posterior teeth and the lower posterior teeth when the fully installed retainers 18 make contact and the wedge-shaped space is greater at premolars of the teeth than molars of the teeth. The retainer bulge may be applied over the anterior teeth when the retainers are fully installed. The retainer bulges may be applied over right first premolars of the teeth and left first premolars of the teeth when the retainers are fully installed. The retainer bulges may be applied over right premolars of the teeth and left premolars of the teeth when the retainers are fully installed.

FIG. 24 shows an orthodontic appliance for holding teeth in place. The teeth form an upper dental arch and a lower dental arch of a patient. The orthodontic appliance comprises an upper retainer 18 conforming to the upper dental arch and a lower retainer 18 conforming to the lower dental arch. The retainers 18 define a receiving space 101 for accommodating a crown of the teeth and the receiving space is occupied by the crown of the teeth when the retainers are fully installed; a biting wall of the retainers conforms to an occlusal surface of posterior teeth of the teeth and an incisal edge of anterior teeth of the teeth; part of the biting wall is spaced outwardly away from the receiving space, such that at least one bulge 105 is formed at the biting wall; and the at least one bulge is dimensioned and positioned to maintain a wedge-shaped space between occlusal surfaces of the upper posterior teeth of the teeth and the lower posterior teeth of the teeth when the retainers are fully installed and have contact with each other, and the wedge-shaped space is greater at premolars of the teeth than molars of the teeth. The retainer is very similar to the aligner; all the embodiments of the aligners in this application can be applied in the retainer also.

Figure 25:
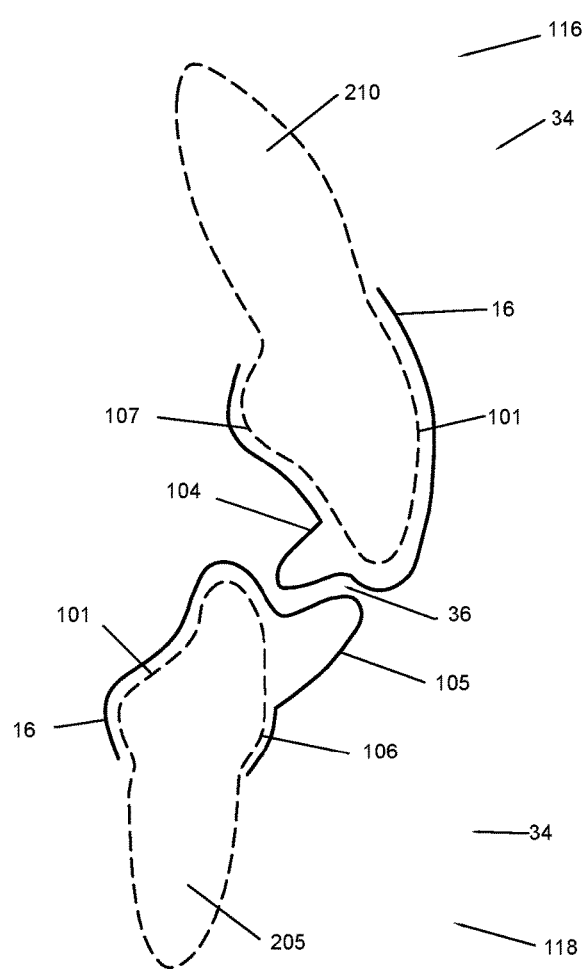
FIG. 25. is a vertical sectional view of the canines of a dentition according to a eleventh embodiment, showing a bulge of the aligner applied over the buccal surface of the lower canine.

FIG. 25 is a vertical sectional view of part of a dentition, showing a bulge 105 of the lower aligner 16 applied over a buccal surface 106 of the lower canine 205 in the lower dental arch 118 when the upper and lower aligners 16 are in fully installed position 34. The bulge 105 has contact 36 with an upper aligner bite ramp 104 over the lingual surface 107 of the upper canine 210 of the upper dental arch 116. The bulge 105 is dimensioned and positioned to maintain a wedge-shaped space 120 between the occlusal surfaces of the upper posterior teeth and the lower posterior teeth when the aligners 16 are fully installed and have contact, and this wedge-shaped space 120 is greater at premolars than molars. The bulge of aligner over the canine may be applied on other anterior teeth when the aligner are fully installed.

Figure 26:
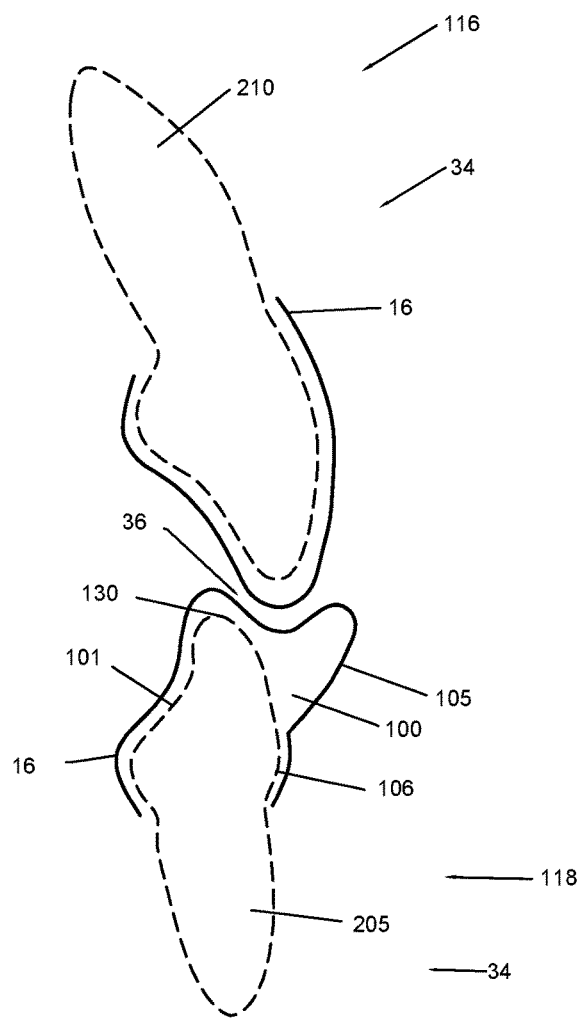
FIG. 26 is a vertical sectional view of the canines of a dentition according to a variation of the eleventh embodiment, showing a bulge of the aligner applied over the buccal surface of the lower canine.

FIG. 26 is a vertical sectional view of part of a dentition, showing a bulge 105 of lower aligner 16 applied over a buccal surface 106 of the lower canine 205 in the lower dental arch 118 when the upper and lower aligners 16 are in fully installed position 34. The bulge 105 has contact 36 with the upper aligner 16. The bulge 105 is dimensioned and positioned to maintain a wedge-shaped space 120 between the occlusal surfaces of the upper posterior teeth and the lower posterior teeth when the aligners 16 are fully installed and have contact, and this wedge-shaped space 120 is greater at premolars than molars.

Figure 27:
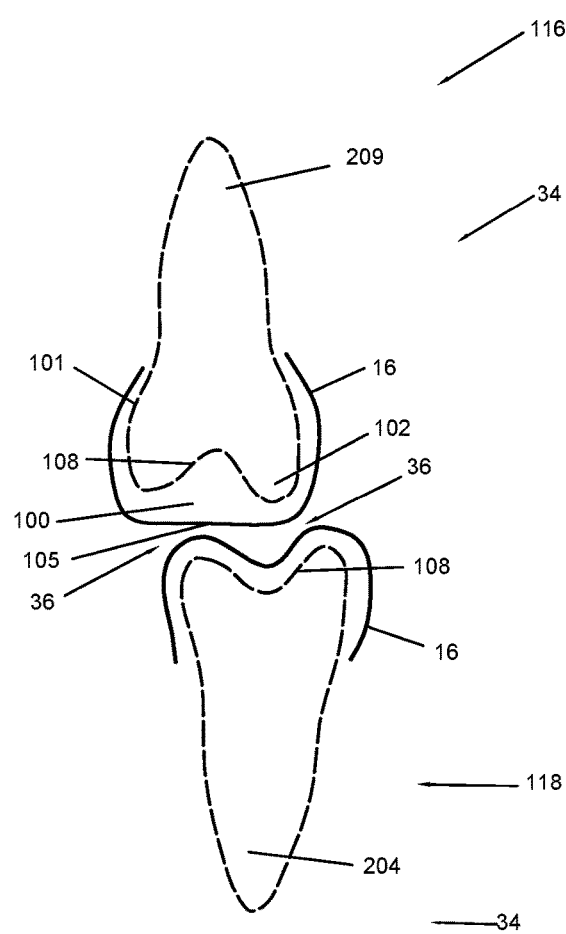
FIG. 27 is a vertical sectional view of the premolars of a dentition according to a twelfth embodiment, showing a bulge of the aligner applied over the occlusal surface of the upper premolar.

FIG. 27 is a vertical sectional view of part of a dentition, showing a bulge 105 of upper aligner 16 applied over an occlusal surface 108 of the upper first premolar 209 in the upper dental arch 116 when the upper and lower aligners 16 are in fully installed position 34 and have contact with each other. The bulge 105 has contact 36 with the lower aligner 16. The bulge 105 is dimensioned and positioned to maintain a wedge-shaped space 120 between the occlusal surfaces 108 of the upper posterior teeth and the lower posterior teeth when the aligners 16 are fully installed and have contact with each other and this wedge-shaped space 120 is greater at premolars than molars. The bulge may be applied over the lower first premolar also. In this embodiment at least one aligner bulge is applied over the right first premolars and at least one aligner bulge is applied over the left first premolars when the aligners 16 are fully installed. Similar arrangements may also be applied at retainers mentioned in this application, in this case at least one retainer bulge is applied over the right first premolars and at least one retainer bulge is applied over the left first premolars when the retainers are fully installed FIGS. 1 to 11 show the bulges applied over canines, premolars and molars; FIGS. 12 to 23 show the bulges applied over anterior teeth. FIGS. 25 and 26 show the bulges applied over buccal surface of the anterior teeth. FIG. 27 shows the bulge applied over first premolar. The bulges over incisors and the bulges over canines, premolars and molars may be applied together in one embodiment. Different embodiments in this application may be applied together in one case to maintain a wedge-shaped space 120 between the occluding surfaces of the maxillary and mandibular teeth when the aligners are fully installed and have contact with each other, and in most cases the aligners should be permitted to have bilateral, steady contact with each other. In some cases, the upper aligner and lower aligner with bulges only have contact at some specific areas in a period of a treatment and gradually develop to better contact with each other; for a deep overbite case, only anterior parts of the aligners have contact in a period of the treatment and gradually develop to better contact between the aligners when the deep overbite is relieved; for an anterior open bite case, only posterior parts of the aligners have contact in a period of the treatment and gradually develop to better contact between the aligners when the open bite is relieved.

The bulge 105 mentioned in this application can be manufactured by using general known methods and technique. The method may comprise the following steps:
(a) providing a positive model of a dentition;
(b) providing an added structure on an occlusal surface or an incisal edge of the positive model;
(c) forming the aligner over the positive model and over the added structure such that the aligner includes a bulge which is applied at the added structure's location.

The added structure is a non-dental structure, i.e. it does not form part of the patient's initial or final tooth arrangement in the dentition model. Instead, the added structure is designed to provide a sacrificial protrusion for the subsequent bulge.

Dentition modelling may use common knowledge in the field of orthodontics to obtain a digital model of a dentition of a patient using a digital scanner, such as iTero. After the repositioning treatment has been design, a plurality of modified digital dentition models can be defined having a plurality of tooth arrangements. One of the modified digital dentition models and a digital model of an added structure can be merged into a combined digital model. A positive model of the combined digital model can be printed out by a 3D printing machine using existing techniques and materials. Similarly, method to program the aligner tooth arrangements by computer are well known. Retainer can be made in the same way with the aligner.

REFERENCE LIST

Teeth 12
Tooth surface 13
Aligner 16
Retainer 18
Fully installed position 34
Contact point 36
Bulge space 100
Receiving space 101
Tooth cusp 102
Occlusal plane 103
Bite ramp 104
Bulge 105
Buccal surface 106
Lingual surface 107
Occlusal surface 108
Guiding surface. 109
Filling material 110
Aligner with greater thickness 112
Upper dental arch 116
Lower dental arch 118
Wedge-shaped space 120
Bulge base 121
Aligner cusp 122
Bulge distal end 123
Biting wall 124
Upper incisor 126
Lower incisor 128
Incisal edge 130
Aligner incisal edge 132
Lower Second molar 201
Lower First molar 202
Lower Second premolar 203
Lower First premolar 204
Lower Canine 205
Upper Second molar 206
Upper First molar 207
Upper Second premolar 208
Upper First premolar 209
Upper Canine 210

Terms such as "top", "bottom", "distal", "proximate", "below," "above," "upper, are used herein for simplicity in describing relative positioning of elements of the aligners, as depicted in the drawings or with reference to a patient's dentition when the aligners are installed. Although the present invention has been described and illustrated with respect to preferred embodiments and preferred uses thereof, it is not to be so limited since modifications and changes can be made as understood by those skilled in the art.

The invention claimed is:

1. An orthodontic appliance being one of a pair of aligners for repositioning teeth and a pair of retainers for holding the teeth in place, the teeth forming an upper dental arch of a patient and a lower dental arch at a mandible of the patient, the orthodontic appliance comprising:
an upper appliance member conforming to the upper dental arch, the upper appliance member defining an upper biting wall conforming with consistent thickness to an upper occlusal surface of upper posterior teeth of the upper dental arch; and
a lower appliance member conforming to the lower dental arch, the lower appliance member defining a lower biting wall conforming with consistent thickness to a lower occlusal surface of lower posterior teeth of the lower dental arch, the upper appliance member and the lower appliance member opposing to each other when the orthodontic appliance is installed,
the orthodontic appliance defining a receiving space for accommodating a crown of the teeth, the receiving space being occupied by the crown of the teeth when the orthodontic appliance is fully installed, the receiving space having a right premolar receiving space for receiving a rightside functional cusp of right premolars of the teeth and a left premolar receiving space for receiving a leftside functional cusp of left premolars of the teeth, a right bulge adjacent to the right premolar receiving space and a left bulge adjacent to the left premolar receiving space projecting outwardly from one biting wall of the upper and lower biting walls, such that when the orthodontic appliance is fully installed and the upper and lower biting walls contact each other adjacent to a right last molar of the teeth and adjacent to a left last molar of the teeth, a rightside distal end of the right bulge and a leftside distal end of the left bulge are dimensioned to contact the opposing biting wall of the upper and lower biting walls, the right bulge and the left bulge are dimensioned to maintain a wedge-shaped space between the upper biting wall and the lower biting wall, and the wedge-shaped space is larger at premolars of the teeth than at molars of the teeth.

2. The orthodontic appliance of claim 1 wherein, when the orthodontic appliance is fully installed, a bulge space is formed between at least one of the right and left bulges and one of the upper and lower occlusal surfaces, respectively.

3. The orthodontic appliance of claim 2 wherein the bulge space is occupied with a filling material.

4. The orthodontic appliance of claim 1 wherein, when the orthodontic appliance is fully installed, the right bulge is applied over a right upper first premolar of the teeth and the left bulge is applied over a left upper first premolar of the teeth.

5. The orthodontic appliance of claim 1 wherein, when the orthodontic appliance is fully installed, the right bulge is applied over a right lower first premolar of the teeth and the left bulge is applied over a left lower first premolar of the teeth.

* * * * *